(12) United States Patent
Riehl et al.

(10) Patent No.: US 8,252,264 B2
(45) Date of Patent: Aug. 28, 2012

(54) METHOD FOR PRODUCTION OF CARBON NANOSTRUCTURES

(75) Inventors: Bill L. Riehl, Beavercreek, OH (US); Jim R. Riehl, Beaver, OH (US); Lee R. Riehl, Beavercreek, OH (US)

(73) Assignee: Riehl-Johnson Holdings, LLC, Fairborn, OH (US)

( * ) Notice: Subject to any disclaimer, the term of this patent is extended or adjusted under 35 U.S.C. 154(b) by 0 days.

(21) Appl. No.: 12/936,433

(22) PCT Filed: Apr. 7, 2009

(86) PCT No.: PCT/US2009/039737
§ 371 (c)(1),
(2), (4) Date: Oct. 5, 2010

(87) PCT Pub. No.: WO2009/126602
PCT Pub. Date: Oct. 15, 2009

(65) Prior Publication Data
US 2011/0033367 A1 Feb. 10, 2011

Related U.S. Application Data

(62) Division of application No. 61/043,514, filed on Apr. 9, 2008.

(51) Int. Cl.
*D01F 9/12* (2006.01)
(52) U.S. Cl. .......... 423/447.1; 423/445 B; 977/742; 977/843
(58) Field of Classification Search .......... 423/445 B, 423/447.1, 447.3, DIG. 40; 977/742, 842–843
See application file for complete search history.

(56) References Cited

U.S. PATENT DOCUMENTS

| 5,286,364 | A | 2/1994 | Yacynych et al. |
| 5,298,144 | A | 3/1994 | Spokane |
| 5,540,828 | A | 7/1996 | Yacynych |
| 6,107,168 | A | 8/2000 | Rupp |
| 7,011,771 | B2 * | 3/2006 | Gao et al. ............ 252/502 |
| 7,138,100 | B2 * | 11/2006 | Smalley et al. ....... 423/447.3 |
| 7,158,219 | B2 | 1/2007 | Li et al. |
| 7,160,531 | B1 * | 1/2007 | Jacques et al. ....... 423/447.3 |
| 7,160,532 | B2 | 1/2007 | Liu et al. |
| 7,162,308 | B2 | 1/2007 | O'Brien et al. |

(Continued)

FOREIGN PATENT DOCUMENTS
EP 1544607 6/2005
(Continued)

OTHER PUBLICATIONS

K. Munbodh, M.S. Thesis, "Evanescent Microwave Characterization of Carbon Nanotube Films Grown on Silicon Carbide Substrate". Jun. 7, 2007.*

(Continued)

*Primary Examiner* — Stuart Hendrickson
*Assistant Examiner* — Richard M Rump
(74) *Attorney, Agent, or Firm* — Walters & Wasylyna, LLC

(57) ABSTRACT

A process for the production of carbon nanostructures by an oxidation-reduction method is described. The growth of carbon nanorods, nanotubes, and nanoclusters on planar and non planar substrates, and free standing is demonstrated. In one embodiment a reactive gas is generated in situ and reacted with a carbide while the byproducts are removed, thereby adjusting the equilibrium to favor the formation of the carbon nanostructured product.

31 Claims, 24 Drawing Sheets

U.S. PATENT DOCUMENTS

| | | | |
|---|---|---|---|
| 7,262,038 | B2 | 8/2007 | Campbell et al. |
| 7,304,128 | B2 | 12/2007 | Jagota et al. |
| 7,488,455 | B2 * | 2/2009 | Dai et al. ............... 422/150 |
| 7,510,695 | B2 | 3/2009 | Smalley et al. |
| 2003/0059364 | A1 | 3/2003 | Prilutskiy |
| 2005/0027153 | A1 * | 2/2005 | Ma et al. ............... 585/664 |
| 2005/0103990 | A1 * | 5/2005 | Pham-Huu et al. ........ 250/281 |
| 2006/0111005 | A1 * | 5/2006 | Geohegan et al. ........ 442/340 |
| 2006/0251565 | A1 | 11/2006 | Leis et al. |
| 2008/0219913 | A1 * | 9/2008 | Gogotsi ............... 423/445 B |

FOREIGN PATENT DOCUMENTS

JP          2004002052 A  *  1/2004

OTHER PUBLICATIONS

PCT, International Search Report and Written Opinion, International Application No. PCT/US2010/050009 (Jan. 20, 2011).
Ameyama, M., *Methods in Enzymology*, vol. 89, Part D, pp. 20-29, published by Academic Press, Inc.
Boeckl, J. et al., "Catalyst-free growth of carbon nanotubes on nonplanar polycrystalline silicon carbide substrates for electrochemical and photochemical applications," *Nanotechnology*, 2006; IEEE-Nano 2006; Sixth IEEE Conference, Cincinnati, Ohio, Jun. 17-20, 2006.
Boeckl, J. et al., "Structural and Electrical Characteristics of Carbon Nanotubes Formed on Silicon Carbide Substrates by Surface Decomposition," *Materials Science Forum*, vols. 527-529, pp. 1579-1582 (2006).
Derycke, V. et al., "Catalyst-Free Growth of Ordered Single-Walled Carbon Nanotube Networks," *Nano Letters*, vol. 2, No. 10, pp. 1043-1046 (2002).
Jones, C.P. et al., "Use of High-Purity Metal-Catalyst-Free Multiwalled Carbon Nanotubes to Avoid Potential Experimental Misinterpretations," published by the American Chemical Society; 4 pages (Jul. 26, 2007).
Kinnear, K.T. et al., "An Amperometric Fructose Biosensor Based on Fructose Dehydrogenase Immobilized in a Membrane Mimetic Layer on Gold," *Analytical Chemistry*, vol. 69 (9), pp. 1771-1775 (May 1, 1997).
Kusunoki, M. et al., "A formation mechanismof carbon nanotube films on SiC(0001)," *Applied Physics Letters*, vol. 77, No. 4, pp. 531-533 (Jul. 24, 2000).
Kusunoki, M. et al., "Aligned Carbon Nanotube Film Self-Organized on a SiC Wafer," *Jpn. J. App. Phys.*, vol. 37, pp. L605-L606, Part 2, No. 5B (May 15, 1998).
Kusunoki, M. et al., "Aligned Carbon Nanotube Films on SiC(0001) Wafers," *Physica B*, 323, pp. 296-298 (2002)
Kusunoki, M. et al., "Epitaxial carbon nanotube film self-organized by sublimation decomposition of silicon carbide," *Appl. Phys. Lett.*, 71 (18), pp. 2620-2622 (Nov. 3, 1997).
Maruyama, T. et al., "STM and XPX studies of early stages of carbon nanotube growth by surface decomposition of 6H-SiC(000-1) under various oxygen pressures," *Diamond & Related Materials*, 16, pp. 1078-1081 (2007).
Mitchel, W.C. et al., "Growth of Carbon Nanotubes by Sublimation of Silicon Carbide Substrates," *Quantum Sensing and Nanophotonic Devices II, Proc. of SPIE*, vol. 5273, pp. 77-83 (2005).
Morton, J. et al., "Detection of Trace Heavy Metal Ions Using Carbon Nanotube-Modified Electrodes," *Electroanalysis*, vol. 21, No. 14, pp. 1597-1603 (2009).
Nagano, T. et al., "Production of Highly Oriented Carbon Nanotube Film by Surface Decomposition of Silicon Carbide Polycrystalline Film," *Jpn. J. Appl. Phys.*, vol. 42, pp. L482-L484, Part 2, No. 5A (May 1, 2003).
PCT, International Search Report and Written Opinion, International Application No. PCT/US2010/031755 (Jul. 21, 2010).
PCT, International Search Report and Written Opinion, International Application No. PCT/US2009/039737 (Jul. 1, 2009).
Wang, J. et al., "Carbon Nanotube/Teflon Composite Electrochemical Sensors and Biosensors," *Analytical Chemistry*, American Chemical Society, vol. 75, No. 9, pp. 2075-2079 (May 1, 2003).
Data Sheet for "Performance SiC," by Morgan Technical Ceramics (Oct. 9, 2007).
Brochure for "Duocel® Ceramic Foam," from the web site of ERG Materials and Aerospace Corporation, http://www.ergaerospace.com/foamproperties/sicproperties.htm (Feb. 9, 2008).
PCT, International Preliminary Report on Patentability, International Application No. PCT/US2009/039737 (Oct. 21, 2010).
Cambaz, Z.G. et al., "Noncatalytic synthesis of carbon nanotubes, graphene and graphite on SiC," *Carbon*, 46, pp. 841-849 (2008).
Harrison, J. et al, "Evaluation of metal-free carbon nanotubes formed by SiC thermal decomposition," *Journal of Applied Physics*, 101, 104311 (2007).
Leis et al., Carbon Nanostructures Produced by Chlorinating Aluminum Carbide, Carbon 39:2043 (2001).
Extended European Search Report, 09731354.8 (Jan. 23, 2012).

* cited by examiner

METHOD FOR PRODUCTION OF CARBON NANOSTRUCTURES

CROSS REFERENCE TO RELATED APPLICATION

This application claims the benefit of U.S. Provisional Application Ser. No. 61/043,514 filed Apr. 9, 2008, the contents of which are hereby incorporated by reference.

BACKGROUND

The present application relates generally to a process for the production of novel carbon nanostructures, and nanostructured films comprised of nanotubes and in a particular embodiment, solid carbon nanorods (SCNRs).

SUMMARY

One embodiment disclosed herein is a process for growing nanostructures on and/or from solid phase carbides. The carbon nanostructures obtained in accordance with this disclosure can be used for electronic, electrochemical, chemical and mechanical applications.

The process includes introducing a reactive gas into a reaction chamber containing a carbide substrate, reacting the reactive gas with the carbide substrate using a reaction that converts carbon in the carbide to elemental carbon nanostructures and produces a gaseous byproduct, and removing the gaseous byproduct from the reaction chamber in a manner that shifts the reaction equilibrium in favor of the formation of carbon nanostructures. In one embodiment, the reaction chamber is part of a graphite reactor.

In another aspect, the process may include removing passivating compounds from the surface of the substrate before reacting the substrate to form the carbon nanostructures and/or an annealing step at a temperature below the minimum conversion temperature, for example 1300° C. to 2300° C.

One manifestation of this invention also relates to novel higher order nanostructures or compositions that are made by the described process and consist of assemblages of SCNRs either free standing or anchored to a solid substrate. Preferred starting materials are carbides in various physical forms and degrees of crystallinity. The size and morphology of the SCNR nanostructure is directly influenced by the size, physical form and crystallinity of the starting material. While silicon carbides are a preferred example of the carbides that can be used in the invention, carbides of substantially any metal or metalloid are theoretically reactive. Representative examples of some of the more common carbides that can also be used herein include barium, aluminum, titanium and tantalum.

To produces the SCNRs the reaction of the substrate in the above described process is conducted under conditions of pressure and temperature and/or the reactive gas is introduced at a rate that favors the production of the solid carbon nanorods. When the rate of introduction of the reactive gas is 1 sccm to 50 sccm per L-reactor volume and the temperature is about 1600° C. to 1700° C. larger diameter solid carbon nanorods will be produced. When the temperature is about 1400° C. to 1550° C. smaller diameter solid carbon nanorods will be produced. In another embodiment, the reactive gas is introduced at a rate of about 20 sccm per liter of reactor volume.

In an alternate embodiment, the reaction of the substrate is conducted under conditions of pressure and temperature and/or the reactive gas is introduced at a rate that favors the production of carbon nanotubes. The reactive gas can be introduced at a rate of about 0.1 sccm per liter of reactor volume. Both the SCNRs and the CNTs may be single walled or multiwalled.

One objective is to provide an efficient process for converting silicon and other carbides to nanotubes and, more particularly, to SCNRs. Particular embodiments of the invention may enable higher volume mass production with higher yields and a more homogeneous SCNR product through more defined control of the reactor conditions, kinetics, and thermodynamics (through selection of the reactants) of the chemical process.

DETAILED DESCRIPTION

A process is disclosed for producing novel nanostructures, and nanostructured films comprised of nanotubes and in a particular embodiment, SCNRs. SCNRs are similar in outward appearance, size, physical properties, and chemical properties to carbon nanotubes, but have a solid core structure. For example, in one embodiment SCNRs are obtained that have a solid structure, with concentric spacing on the order of crystalline graphite, for example, spacing of approximately 0.4 nm.

SCNRs can be considered a subclass of MWCNTs and at the limit, when there is just a single wall, SCNRs can be considered as the smallest diameter (about 0.4 nm) single walled carbon nanotubes that have previously been described. The relative amounts of single walled SCNRs versus multi-walled SCNRs within a given SCNR assemblage fabricated by the disclosed process can be controlled by adjusting process related parameters as described below.

In one of the embodiments, the SCNRs are typically grown normal to the substrate, and are typically uniform in diameter and length, and may be grown on substantially any geometry of the substrate using the metal carbide as the carbon source. In one embodiment, the carbide substrate can be completely converted to CNTs, SCNRs or SCNR clusters if desired.

Figure 1:
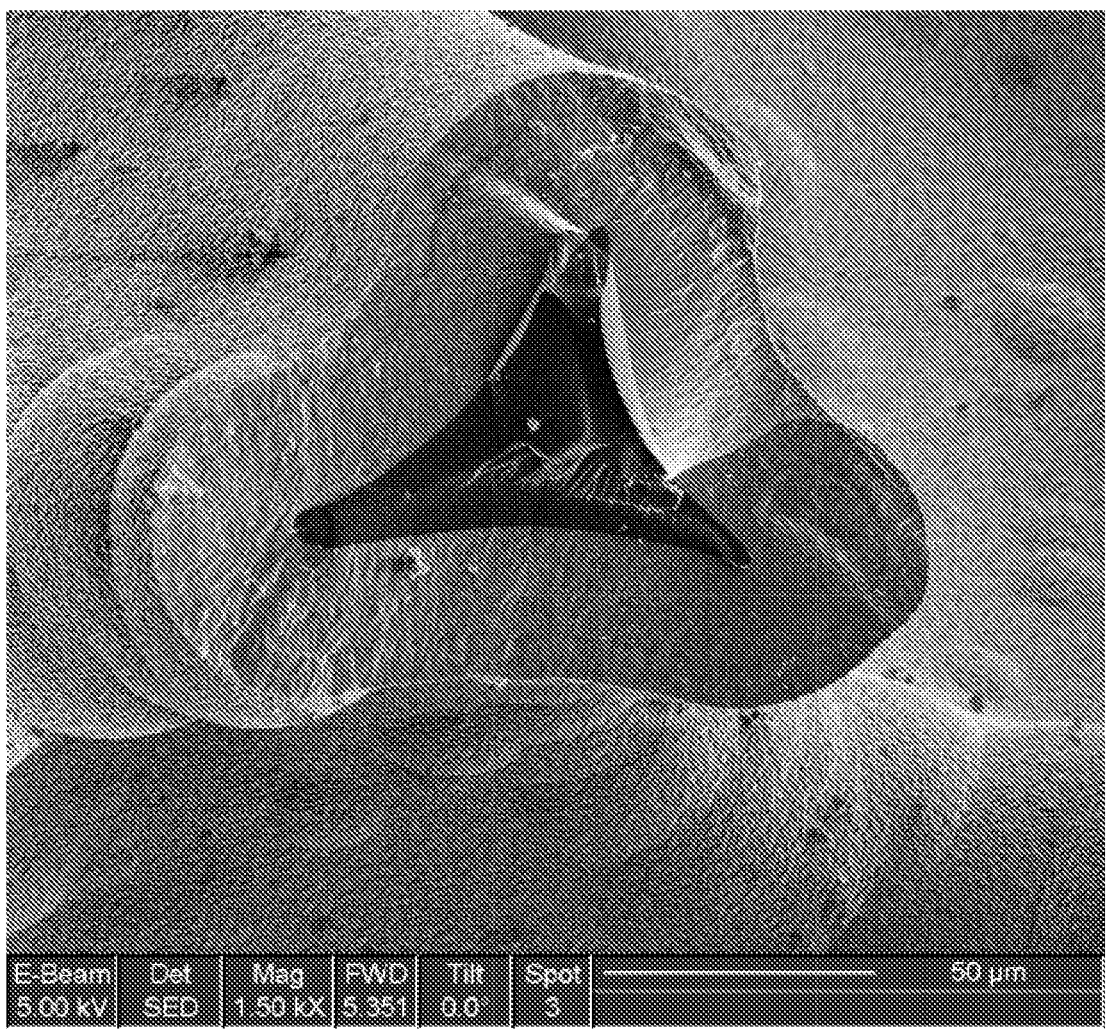
FIG. 1 shows a TEM image of a cross section of a SiC coated RVC foam from ERG Aerospace showing the cubic polycrystalline SiC layer with a dense layer of SCNRs on the surface.
Figure 2:
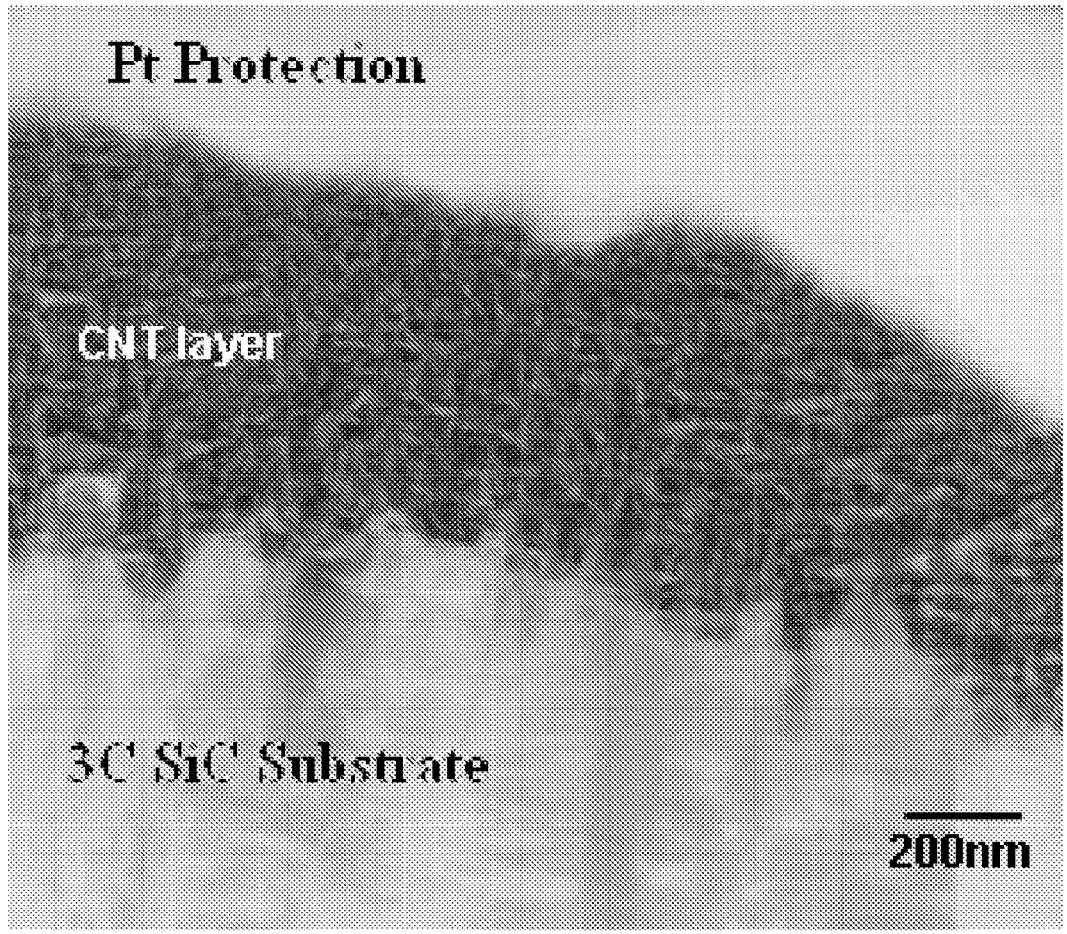
FIG. 2 is cross sectional TEM image of non planar SCNR Array on the SiC coated RVC foam of FIG. 1.
Figure 3:
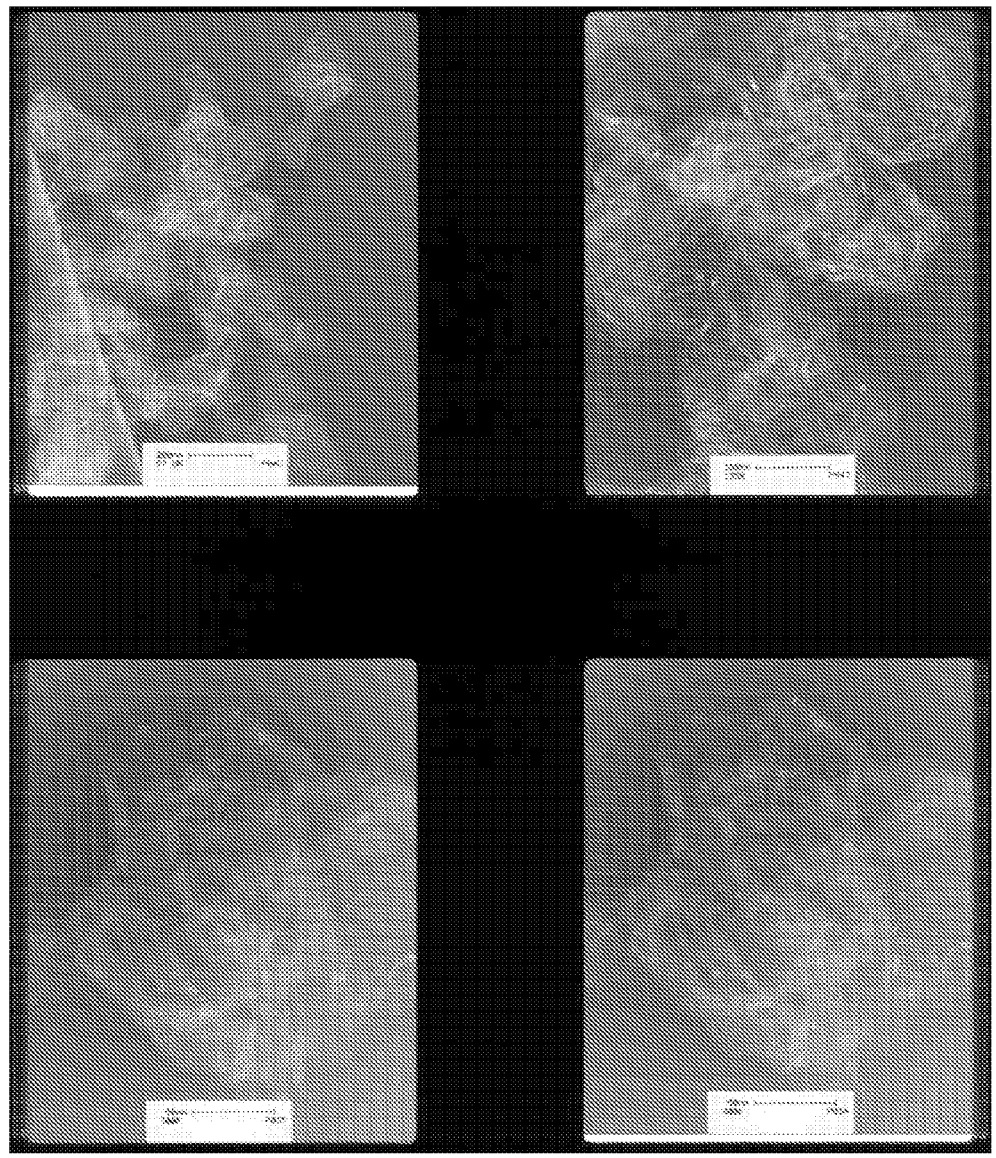
FIG. 3 shows TEM images of SCNR nanoclusters grown from nanometer scale SiC.

FIGS. 1, 2, and 3 show TEM images of non planar SCNR arrays and SCNR clusters, respectively. FIG. 1 is a cross section of SiC coated RVC foam from ERG Aerospace showing the cubic polycrystalline SiC layer with a dense layer of SCNRs on the surface. The reduced vertical alignment of the SCNRs on these foam materials as compared to the films grown into SiC wafers can be attributed to an increased surface roughness due to the polycrystalline growth of the SiC. FIG. 2 shows the cubic polycrystalline SiC coating with a darkened SCNR layer on the surface. Note that a Pt protection layer was deposited during the TEM sample preparation stages and is not a part of the "surface reaction" process. FIG. 3 shows TEM images of SCNR nanoclusters grown from nanometer scale SiC powder.

Growth Process

The invention is described below in detail by reference to specific embodiments and manifestations of it. In one embodiment, the process includes a preliminary step of cleaning the surface of the carbide, for example, using high vapor pressure organic solvents (such as acetone, alcohol, or hexanes), plasma etching, acid etching, or similar means. Etching is done to remove inert oxide and nitride compounds that may interfere with the growth process, for example SiC will passivate with exposure to air, forming $SiO_2$ on the surface. In one embodiment, a hydrofluoric acid wash, typically 10 to 25% concentration is used to remove the oxides and nitrides if necessary.

In one embodiment, inert gases, typically $N_2$ and/or noble gases are used in combination with the reactive gas to adjust the reaction and the quality of the product nanostructures. In one embodiment, reactive gases are chosen based on their ability to participate in the necessary redox reaction to produce elemental carbon (oxidation of carbon) and in the process form a gaseous byproduct at the process temperature used which can be swept away in order to drive the equilibrium toward carbon production. Typical reactive gases used include $H_2O$, $CO$, $O_2$, $NO_x$, $H_2$, $Cl_2$, $F_2$, other halogens and admixtures of these gases. However, additional reactive gases may be used particularly organometallics, perchlorates, and peroxides.

In one embodiment, SiC is reacted with air in a graphite reactor. In one embodiment, reactive carbon oxides are produced in situ via reaction of oxygen and the graphite components of the reactor. Water is present in the graphite reactor, typically in the air bleed, as vapor to participate in the reaction of the SiC. The relevant reactions of SiC that occur within a graphite reactor zone at the appropriate temperature and in the presence of the appropriate reactive gases (oxygen and water) are believed to be:

$$SiC + CO \leftrightarrow 2C + SiO \text{ and,} \tag{1}$$

$$SiC + H_2O \leftrightarrow SiO + C + H_2. \tag{2}$$

The substrate for the process may be any carbide ceramic, such as silicon carbide, in single crystal, polycrystalline or amorphous states. The carbide may be present as a coating applied to another inert substrate by any number of synthetic methods/processes including vapor deposition, pulsed laser deposition or any other process known for application of carbides. Alternatively, pure carbide materials including powders and solid wafers can be utilized. The crystallinity and morphology/surface profile of the substrate affects the resulting nanostructure, for example by templating the carbon in a defined and controlled way. In one embodiment the carbide is dusted on a graphite tray as a powder that may range in particle size from about 10 nm to 50 um.

Additional reactions may be written for other metal/metalloid carbides. Carbides are also known to react with other gases such as hydrogen or chlorine as shown below in reactions 3 and 4, respectively:

$$SiC_{(s)} + 2H_{2(g)} \rightarrow SiH_{4(g)} + C_{(s)} \tag{3}$$

$$SiC_{(s)} + 2Cl_{2(g)} \rightarrow SiCl_{4(g)} + C_{(s)} \tag{4}$$

$$TiC_{(s)} + 2Cl_{2(g)} \rightarrow TiCl_{4(g)} + C_{(s)} \tag{5}$$

$$2B_4C_{(s)} + 3Cl_{2(g)} \rightarrow 2BCl_{3(g)} + 2C_{(s)} \tag{6}$$

$$Cr_3C_{2(s)} + 6Cl_{2(g)} \rightarrow 3CrCl_{3(g)} + C_{(s)} \tag{7}$$

Thus, it is expected that these gases could be substituted for or used in combination with carbon oxides such as carbon monoxide and used similarly to form nanostructured carbon materials on carbide substrates. However, these reactions are not used commonly due to the handling issues created with reactants such as hydrogen and chlorine gas, and products, liquid or gaseous silicon compounds that are poisonous and/or explosive. SiO has the advantage of being in the solid phase and easily scavenged during reaction.

A reactive gas is chosen based on the desired chemical reaction and the substrate involved. It is preferred that 1) the metallic or metalloid (e.g., Si) component react to form a gaseous compound at the processing temperature, 2) the reactive gas does not passivate the carbide surface, 3) the reactive gas does not oxidize or reduce the carbon nanostructured product and 4) the gaseous byproduct(s) of its reaction with the carbide do not competitively react with the carbon product.

Figure 4:
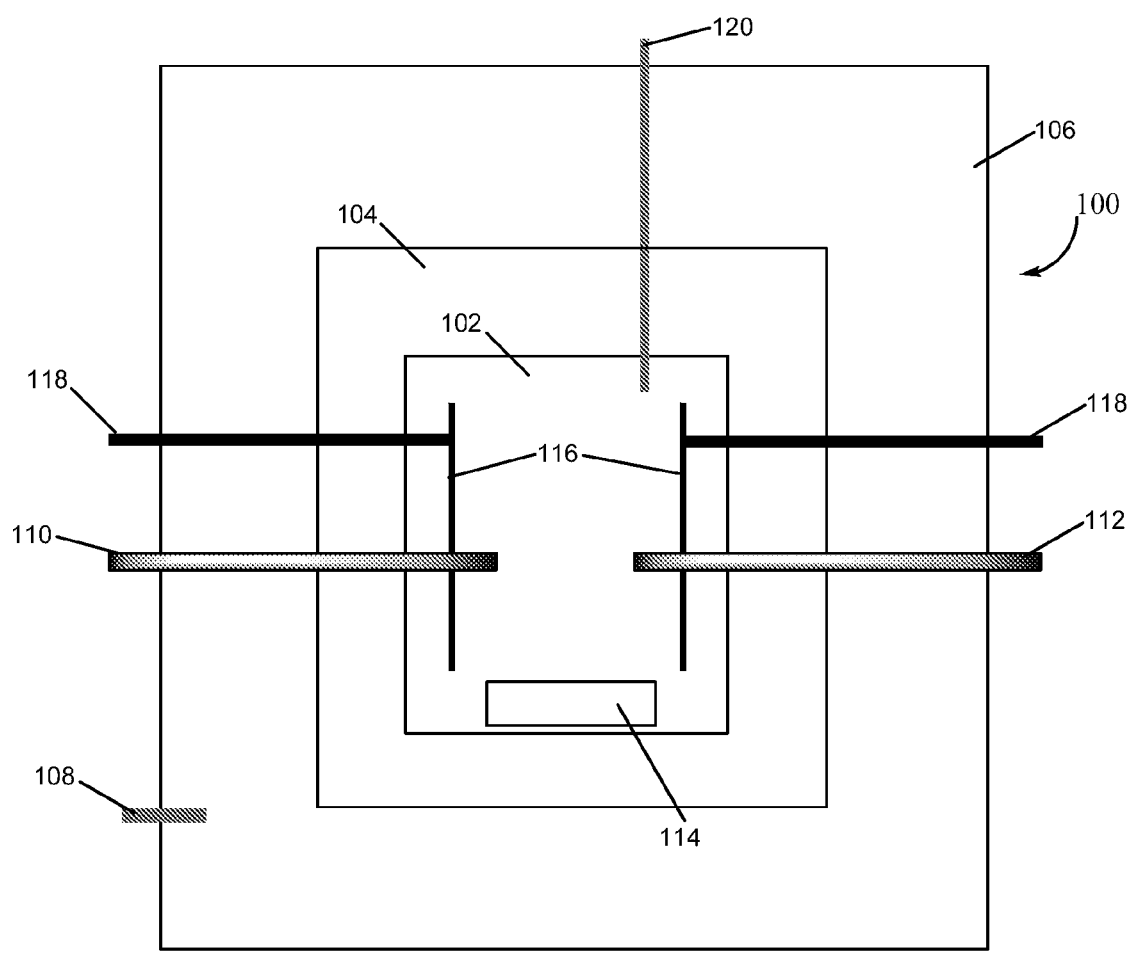
FIG. 4 is a cross-sectional view of a graphite hot zone reactor.

Referring now to FIG. 4, a graphite hot zone reactor 100 useful in one embodiment is shown. The graphite hot zone reactor 100 includes a reaction chamber 102 insulated by graphite insulation 104 housed within a cooled pressure vessel 106 that includes a thermocouple pressure sensor 108 to monitor the pressure therein. The reaction chamber 102 includes a graphite stage 114 for growing the carbon nanostructures and one or more graphite resistant heating elements 116 connected to graphite electrode posts 118. A reactive gas bleed nozzle 110, which may be graphite, is in fluid communication with reaction chamber 102 to introduce reactive gas to the chamber and an effluent nozzle 112 is in fluid communication with reaction chamber 102 to remove gaseous byproduct. The graphite hot zone reactor 100 may also includes a thermocouple, optical pyrometer, or other monitoring device for monitoring conditions within reaction chamber 102.

In one embodiment, by controlling the rate at which the reactive gas is introduced into the chamber and by controlling the rate with which the gaseous byproduct exits the chamber through the effluent nozzle, a faster, more complete conversion is achieved than might otherwise be obtained. Reactive gas may be bled or pumped into, depending on the reactor conditions, the reaction chamber. In the case of air bleed into a graphite hot zone reactor, the oxygen reacts with the graphite nozzle to form carbon oxides in situ, thus providing a supply of reactive gas in the form of COx. Similarly, the gaseous byproducts are actively removed from the reaction zone by the effluent nozzle, for instance attached to a vacuum pump. Thus reactants are fed into the reactor, and byproducts are removed, forcing the chemical equilibrium to the formation of carbon nanostructures, enhancing the rate of reaction.

Other reactions may be used to produce various carbon nanostructures, such as graphene sheets, nanotubes, and nanorods. A generic reaction mechanism is proposed.

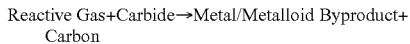

Reactive Gas+Carbide→Metal/Metalloid Byproduct+ Carbon

Figure 5:
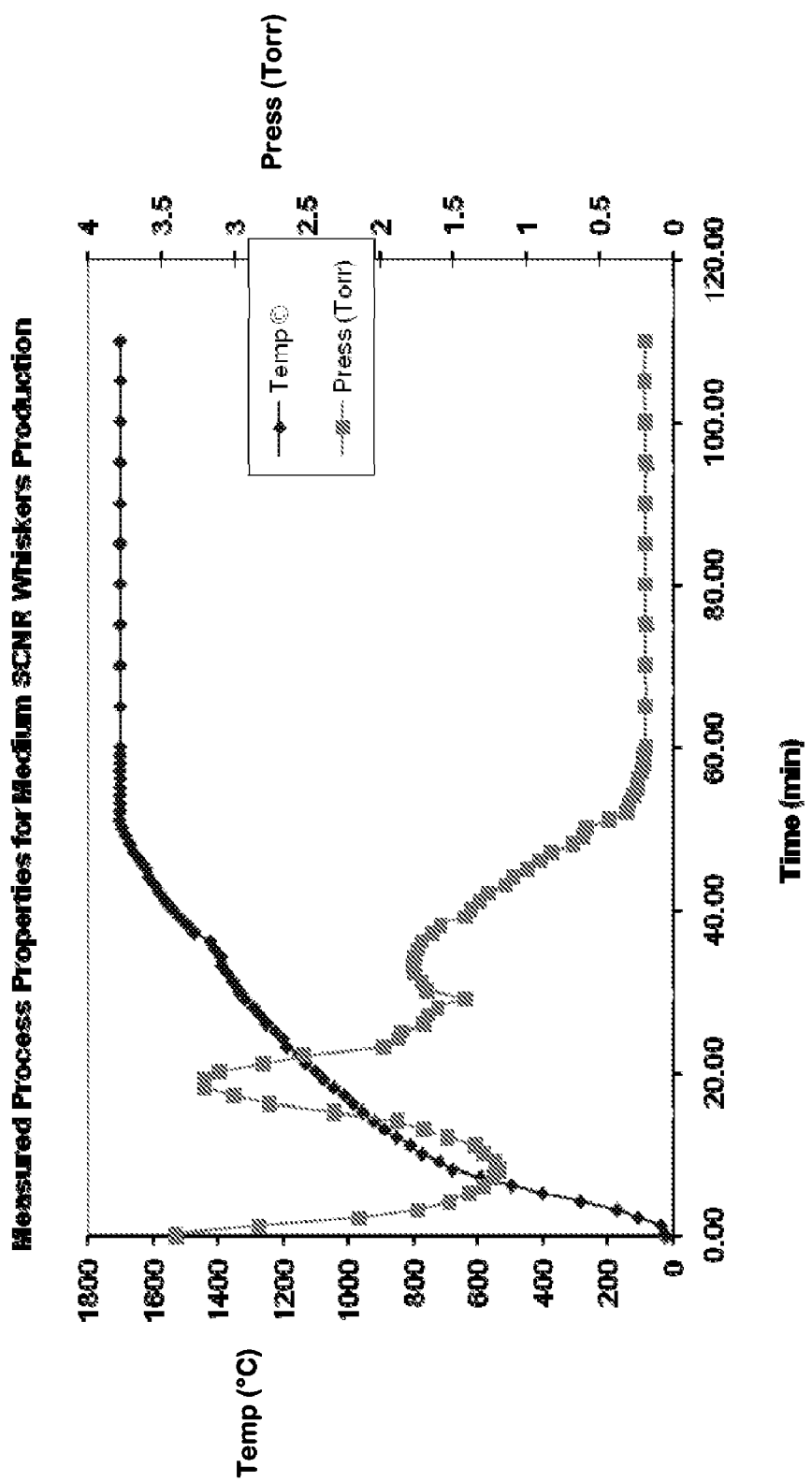
FIG. 5 is a time-temperature-pressure profile of medium production batch SCNR Whiskers.

Now referring to FIG. 5, a typical process curve for temperature/pressure and time for the graphite hot zone reactor is shown. As the reactor is evacuated, the system is heated. Initially, pressure declines sharply as air is pumped out of the reactor. Beginning at approximately 550° C., the reactor begins to outgas adsorbed gases and moisture. This corresponds to the pressure spike observed at approximately 20 minutes in the figure. Pressure steadily and sharply drops after desorption, until reaching a temperature of approximately 1300° C., where the chemical reaction begins. Pressure will peak as the reactive gases present react with the carbide and then the pressure will begin to drop as the reactive species is consumed, and reach steady state as the influent gas becomes the limiting reagent. Pressure will slowly decline as the reaction reaches completion, typically 48 hrs using the above embodiment, where pressure will reach steady state as no further reactions take place. Reactive gas (air) introduction is typically started upon reaching 1700° C., but may be started at any point during processing. In the embodiment diagrammed in FIG. 5, the air introduction was started at t=0 (when evacuation was started).

In one embodiment, the carbon that is formed can be nanostructured and in the form of single SCNRs or more complex structures such as clusters, whiskers or films of aligned SCNRs depending on the physical form of the substrate and the reactor conditions. At lower reaction rates, such as those occurring during a very slow bleed in of reactive gas (for example, about 0.1 sccm per liter of reactor volume), the conversion is slowed such that CNTs are formed. Whereas at higher bleed rates (for example, about 20 sccm per liter of reactor volume), and thus pressures, SCNRs are formed. The relative numbers of SW-SCNRs vs. MW-SCNRS can also be controlled by manipulating reactor conditions. The actual transition will ultimately depend on local conditions. Additionally, lower temperatures (such as 1400° C.) favor the formation of single wall products, and higher temperatures favor the formation of multiwall products.

Thus, using procedures and processes described herein, SCNR nanostructures can be produced which are anchored on a substrate or free standing. Free standing, SCNRs can be fabricated either as individual SCNRs or as interlaced clusters depending on the geometry, surface roughness and crystallinity of the starting carbide powder material. Interlaced SCNR clusters are formed by treating starting material that is in the form of a powder consisting of individual particles that are either crystalline or polycrystalline. The ultimate morphology of the clusters depends primarily on the nature of the starting material including: 1) the surface roughness, 2) crystallinity, and 3) if it is polycrystalline, the size of the crystallites. In general, the use of powders with single crystalline particles results in the formation of SCNR clusters that are comprised of SCNRs that are less kinked or folded on themselves than the SCNRs in the clusters resulting from the use of powders consisting of multiple crystallites. Specific starting materials that can be used to form interlaced clusters include SiC powders of various particle sizes and aspect ratios, both crystalline and polycrystalline.

Substrate anchored layers of SCNRs can be produced either in the form of aligned arrays when using a polished carbide substrate, such as an etched single crystal SiC wafer, or as tangled arrays when using a solid, free standing polycrystalline carbide substrate or a SiC coated substrate such as is obtained when SiC is CVD deposited on reticulated vitreous carbon foams, or filaments or fibers made of other materials.

The reactants used in the invention should be cleaned prior to use by traditional methods including organic wash or plasma technique. Substrates are then placed in a heated reactor, and brought to temperature, typically between about −20° C. and about 3000° C., more typically between about 900° C. and about 1900° C. and in a particular embodiment, about 1400° C. to about 1700° C.

Care must be taken when choosing the source material and processing parameters to avoid side reactions that may hinder or prevent the described process. For instance, while ammonia is a reactive gas that will react with SiC, its choice is undesirable due to the possible passivation of the carbide via formation of nitrides on the surface. Temperature is chosen on the basis of the desired carbon nanostructure, and desired rate of reaction. For example, if oxygen is used in the reaction it will passivate the SiC surface with $SiO_2$ unless a reactive carbon source or other mechanism is used to scavenge and convert oxygen to a reactive gas such as carbon oxide (CO, $CO_2$, or $C_xO_y$). Gas mixtures are chosen to selectively corrode one component or series of components from the material, creating the nanostructure. The concentration of reactive gas is chosen based on the desired reaction rate and product. Higher concentrations (partial pressures greater than 0.01 Torr) are chosen to form SCNRs, while lower concentrations (partial pressures less than 0.0001 Torr) are chosen for CNTs. This is conveniently done by selecting a reactive gas that produces, for example, SiO as a product. This species in the vapor phase at the temperatures involved may be convectively removed from the hot zone via the effluent siphon or condensation. Similar mechanisms can be described for a host of reactive gases and corresponding starting materials.

Duration of processing depends on the desired nanostructure geometry and morphology, kinetics, temperature and reactant concentrations, with times typically ranging from 5 minutes to several days. Smaller product sizes and higher surface area lead to faster processing times. Processing time also depends on the ratio of reactant mass to reactor volume. Gradual ramping of the reactor temperature may be used to prevent internal stresses within the substrate and to manipulate the number of walls of the SCNRs. Additionally, if polycrystalline or amorphous material is used, a crystallization aneal below the minimum conversion temperature (for example, 1300° C. to 2300° C.), but above the crystallization temperature of the material may serve to crystallize amorphous material or increase crystallite size on polycrystalline material. For polycrystalline material, this serves to reduce the number of kinks and interlacing of the SCNRs.

It has been observed that faster ramp times (for example 30°/min to 240°/min) and higher temperatures (for example 1600° C. to 1700° C.) result in larger diameter SCNRs, whereas lower process temperatures (for example 1400° C. to 1550° C.) result in smaller SCNRs or single walled SCNRs.

Similarly, by adjusting the rate of reaction via controlling the type and/or concentration of the reactive gas, the product can be modified. This includes but is not limited to controlling the length, diameters, degree of kink, and structural isomers of the resulting nanostructures. The design of the reactor must also be taken into account. The preferred design is a chemically inert or reactive design, e.g., one that reduces a precursor gas to a reactive gas, such as an all graphite hot zone reactor. It is important to choose material/s of construction for the reactor that will not interact with the process in a negative fashion. For example, alumina is to be avoided for the SiC process due to side reactions that will interfere with the process, while graphite or tungsten works acceptably. The instant process is therefore unique in its versatility (the use of a host of different reactants), and scalability through the use of economic reactants and reactor design.

EXAMPLES

Example 1

Medium Production, Batch Process, SCNR Whiskers

Cleaned SiC powder (Alfa Aesar, Stock No. 38787) was loaded into a graphite hot zone reactor. In this case, the particles of the starting material have an aspect ratio of at least 5:1 (length:diameter) and are defined as "whiskers." A hot zone 14 in by 14 in by 14 in was used. Isomolded graphite trays, 0.25 in thick, and 12 in square were used, separated by 1 in cube graphite blocks. Each tray was dusted with powder, to a thickness of 1/32 in to 1/16 in with the aforementioned SiC whiskers. The reactor was loaded with up to 10 trays, each holding up to 15 g of SiC whiskers. Additional trays may be used depending on the size of the reactor hot zone. The system was then evacuated to 10 Torr or below, and temperature ramped to 1700° C. at 30° C./min. Once 1700° C. was reached the temperature was maintained for 6 hours while air was introduced directly into the hot zone via a graphite gas nozzle at a rate of 20 sccm. This was done to ensure that the carbon oxides are the limiting reagent and to control the process. The graphite nozzle serves to react with $O_2$ in the air bleed to form carbon oxides. Thus a supply of reactive gas is formed in situ and supplied constantly to the reactor. Total pressure in the system is monitored and used to determine the progress and extent of reaction.

At approximately 1300° C., pressure begins to rise, signaling the onset of the corrosion process, and will continue to rise. Depending on the amount of SiC used in relation to the reactor volume, the increase in pressure may be rapid or slow, and for larger batch sizes, a degassing peak is often observed due to out gassing of water or organics from the raw material. Pressure will then plateau, indicating consumption of the initial "charge" of oxygen. Pressure started to decline after stabilizing. This indicates recycling of the oxygen containing species, in this instance SiO. SiO produced may react with the reactor hot zone walls or graphite elements to produce Si and CO in order to continue the process a finite amount. Pressure will continue to fall to steady state, indicating completion of the reaction. At lower rates of reactive gas injection, the change in pressure during reaction may be small, thus longer reaction times should be used to ensure completion. Pressure in the reactor follows the general profile as shown in FIG. 5.

Figure 6A:
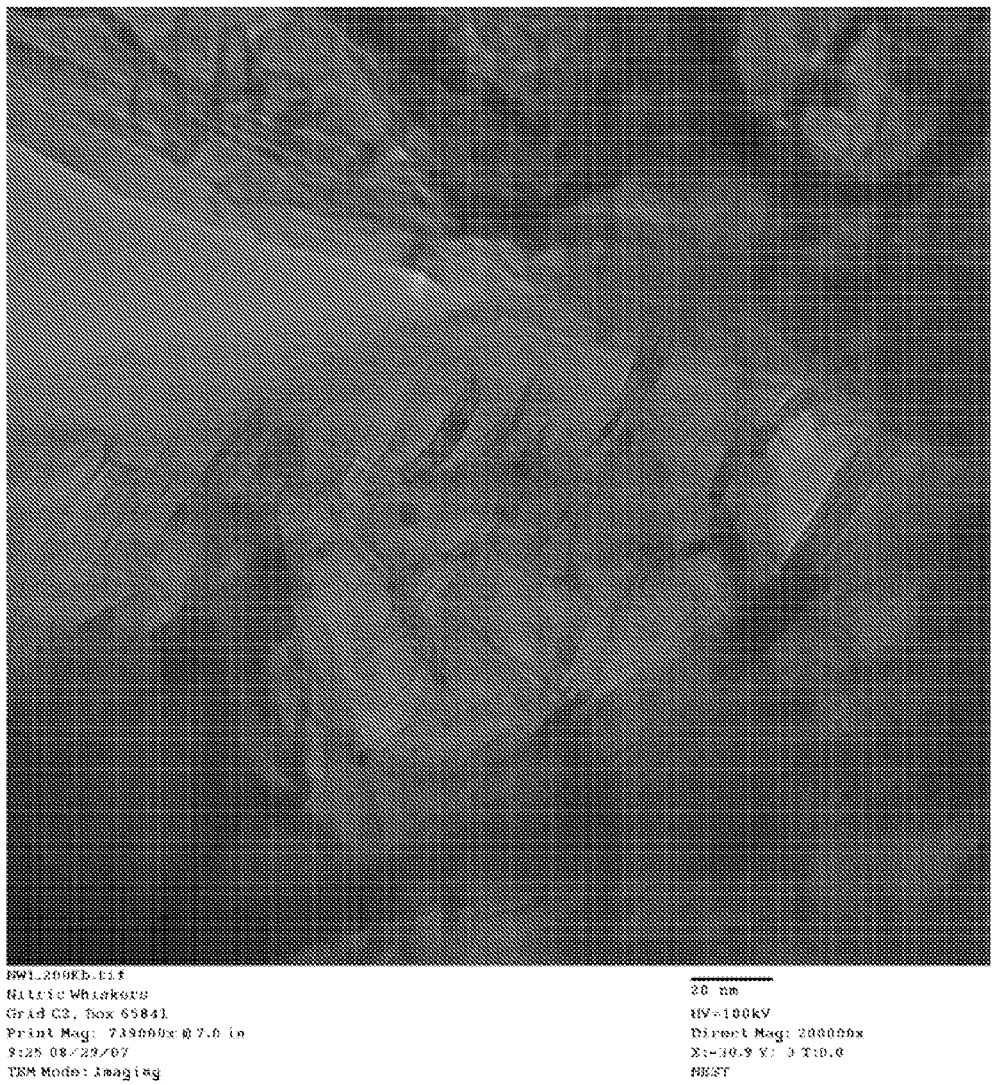
FIGS. 6A-6B show TEM images of SCNR Whickers at 20 nm scale and 500 nm scale, respectively.
Figure 6B:
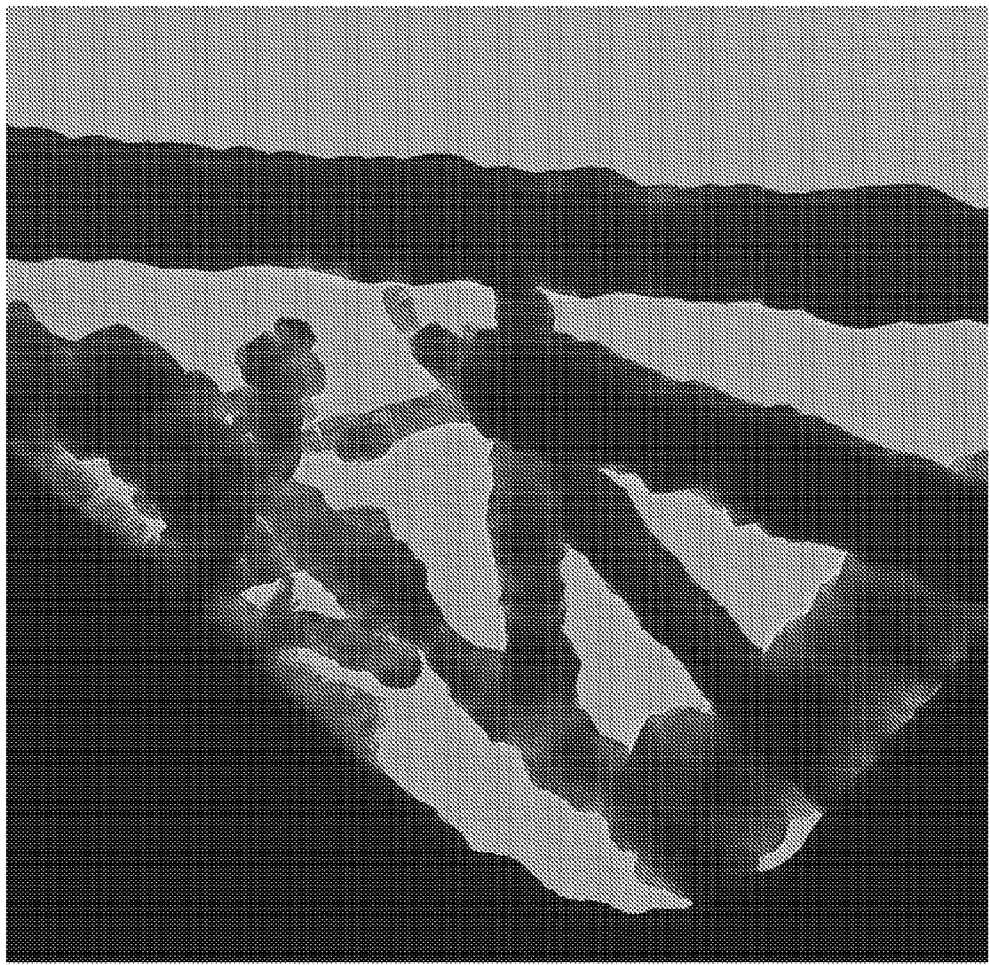

Once pressure has reached steady state, typically between about 0.25 Torr to 1.5 Torr, the reactor is shut down and allowed to cool. No gas was injected into the reactor during the cool down. FIG. 6A is a TEM of the resulting SCNR whiskers at a 20 nm scale and FIG. 6B is the same SCNR whickers enlarged at a 500 nm scale.

Example 2

Planar Aligned SCNR Array

Typically, planar arrays are produced in small batches owing to the large purchase cost of SiC wafers. Doped and undoped, typically nitrogen dopant, SiC wafers are used interchangeably for SCNR array production. For Example 2 a single crystal or polycrystalline polished or etched SiC wafer was obtained and cleaned via standard procedures. Once cleaned, the wafers were placed in a graphite hot zone reactor as described above, typically with the Si face up. The significance of the crystal orientation lies in the reaction rates observed, in particular that the Si face corrodes significantly faster than the C face. The system was evacuated as described above, and the temperature was ramped to 1700° C. like in Example 1. Additional reactive gas was not necessary due to the small amount of source material and residual air left at $10^{-1}$ Torr. The system was maintained at 1700° C. until the desired SCNR film thickness was maintained.

Figure 7:
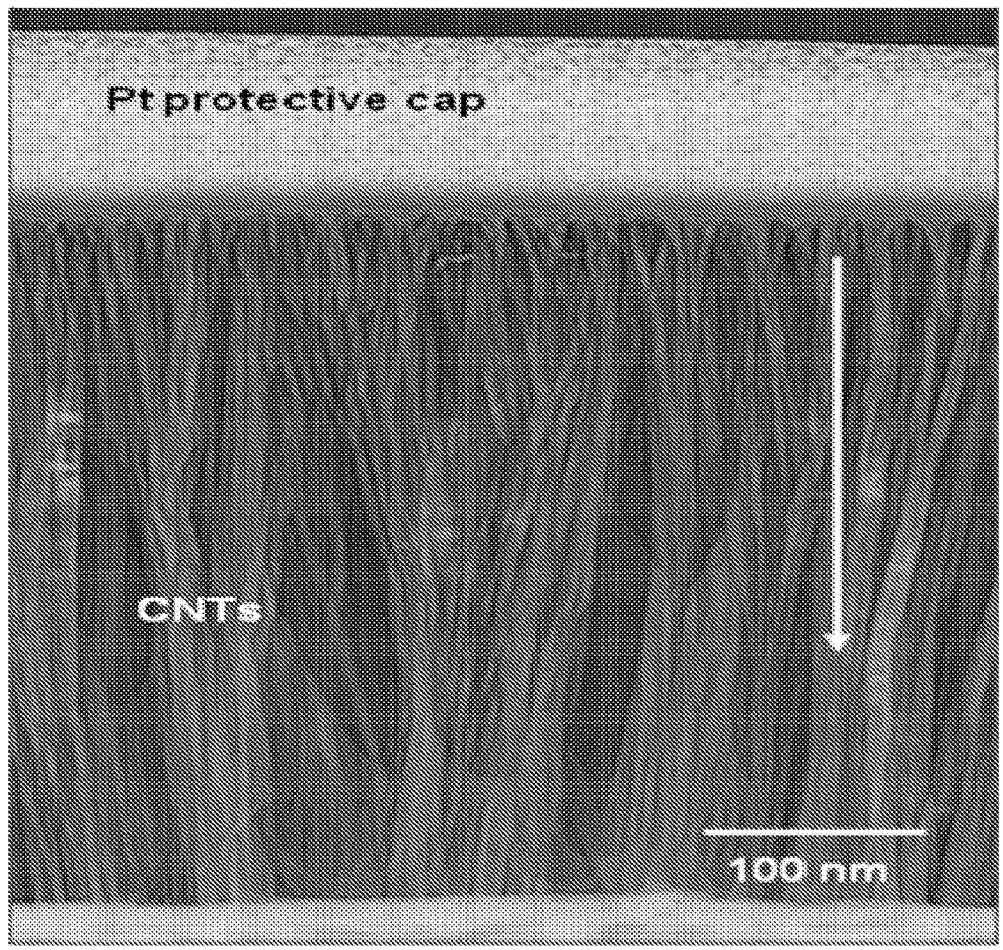
FIG. 7 shows a TEM image of aligned SCNR array on a SiC wafer.

Pressure, with wafers 2 in in diameter or less, does not vary significantly from start to finish. Height of the SCNRs varies directly with processing time until reaching a height of roughly 1 um, at which point, decay in growth rate is experienced. Here, the SCNRs were allowed to grow for 2 hours at the maintained temperature of 1700° C. FIG. 7 shows a cross section of the SCNRs grown from a single crystal SiC wafer at 1700° C. for 2 hrs and 0.1 Torr according to Example 2.

Larger quantities of SCNR/CNT arrays may be produced due to the influent reactive gas and gaseous product removal.

Example 3

Non-Planar SCNR Arrays

A sample of ERG Materials and Aerospace (Oakland, Calif.) Duocell SiC coated reticulated vitreous carbon (RVC) foam was obtained at 45 ppi. It is noted that the material as received is polycrystalline, and therefore does not require further crystallization for processing into SCNRs. The sample was diced into 1 $cm^3$ cubes with a diamond saw. The cube was then cleaned with organic solvents and washed with 25% HF, followed by a rinse in DI water.

Following cleaning, the foam substrate was placed into a graphite reactor and the system evacuated to 1 Torr as before. The system was heated to 1700° C. and maintained at that temperature for 2 hours. Additional reactive gas is not necessary due to the small amount of source material and residual air left at 1 Torr. Processing was identical to the planar array of Example 2, and the resulting array is shown in FIG. 2.

Figure 8:
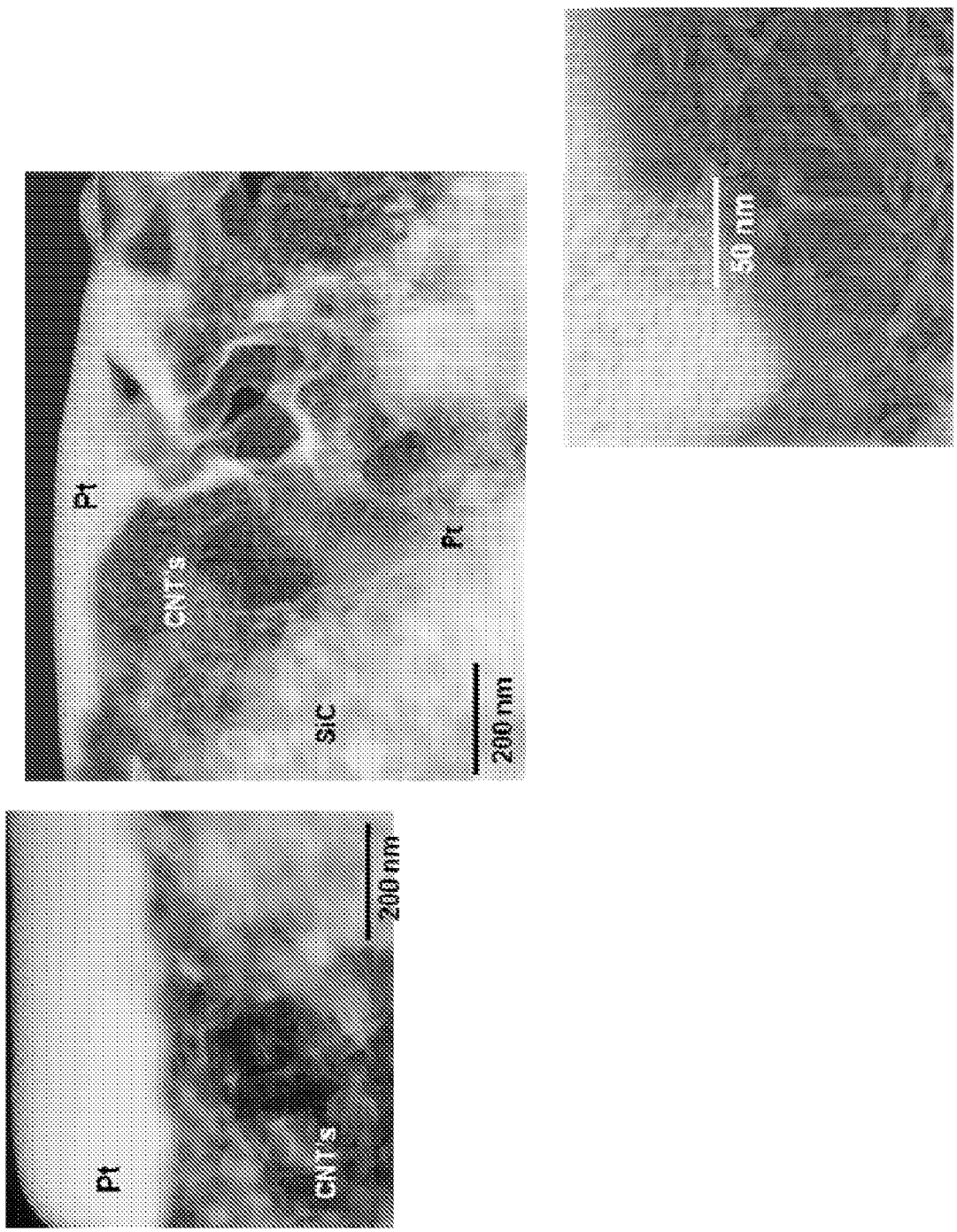
FIG. 8 shows TEM images of SCNR coated SiC Filament at various nm scales.

A sample of SCS-6 SiC coated carbon fiber was obtained from Specialty Materials, Inc. (Lowell, Mass.). This material, as received is amorphous SiC and coated with a thin layer of carbon as a lubricant. It is therefore necessary to remove the carbon layer and crystallize the SiC prior to processing into SCNRs. This is accomplished by heating the sample in an alumina hot zone horizontal tube furnace to 1600° C. for 96 hrs. The carbon is oxidized off of the surface and the underlying SiC layer is passivated, preventing unwanted decomposition. Once cooled and removed from the furnace, the sample was cleaned with 25% HF for 24 hrs to remove the passive layer on the SiC. FIG. 8 shows a TEM of the resulting non planar SCNR array after the same process was used to convert the SiC to SCNRs as with the vitreous carbon foam based non-planar array just discussed.

Example 4

Large Production SCNR Nanoclusters from SiC

The same SiC material that was described in Example 1, above, was used in this case. For large production batches, in excess of 50 g, materials handling is simplified. Material received is assumed clean if received at 99%+purity levels, thus no pre treatment is used to clean the carbide. The SiC material was loaded into a mechanically agitated reactor or rotatable retort capable of direct gas injection. A retort mechanically agitates the material, thus equalizing the carbide contact time with the reactive gas. Whereas before when using a sheet, mass transport of the reactive gas to the substrate or material relied solely on diffusion. This slows the conversion process for the underlying layers of material. The retort was loaded ¼ to ⅓ of volumetric capacity and installed into the reactor. The system was then evacuated to 1 Torr or below, rotation of the retort started at approximately 5 rpm and the temperature ramped to 1700° C. at 30° C./min. Once 1700° C. was reached the temperature was maintained for 6 hours while air was introduced directly into the hot zone via a graphite gas nozzle at a rate of 20 sccm.

It is noted that the reactor follows the temperature—pressure profile of the medium batch process previously discussed. Once pressure has reached steady state, typically 0.25 Torr to 1.5 Torr, the reactor was shut down and allowed to cool. No gas was injected into the reactor during cool down. No significant deviation was noticed during the reaction in comparison to the process variables of the medium batch. This is likely due to the injection of reactive gas at the same volumetric flow rate acting as the limiting reactant, and therefore a control variable used in manufacture.

Example 5

Medium Batch 2.0 um SCNR Cluster, $Al_4C_3$ Starting Material

Aluminum carbide, roughly 2.0 um particle size was procured from Alfa Aesar (Stock No. 14038, Ward Hill, Mass.). The powder was utilized as received, with no pre-cleaning or treatment prior to use. 50 g of the powder was dispersed evenly on ten 12 in by 12 in by 0.25 in thick medium grain extruded graphite plates, separated by 1 $in^3$ cube graphite blocks, stacked vertically. The plates were then loaded into a graphite hot zone reactor and evacuated to 1 Torr, then heated to 1700° C. at a rate of 30° C./min. Once at 1700° C., air was introduced into the hot zone at a rate of 20 sccm and the material allowed to react for 48 hrs, then cooled without air injection to room temperature where the material was unloaded and examined Analysis by TEM confirmed the presence of SCNR clusters.

Example 6

Medium Batch 5.0 um SCNR Clusters, $B_4C$ Starting Material

Boron carbide, roughly 5.0 um particle size, was procured from Alfa Aesar (Stock No. 43002, Ward Hill, Mass.). The material was utilized as received, with no pre-cleaning or other treatment prior to use. 50 g of the powder was dispersed evenly on ten 12 in by 12 in by 0.25 in thick medium grain extruded graphite plates, separated by 1 $in^3$ cube graphite blocks, stacked vertically. The plates were then loaded into a graphite hot zone reactor and evacuated to 1 Torr, then heated to 1700° C. at a rate of 30° C./min. Once at 1700° C., air was introduced into the hot zone at a rate of 20 sccm and the material allowed to react for 48 hrs, then cooled without air injection to room temperature where the material was unloaded and examined Analysis by TEM confirmed the presence of SCNR clusters.

Example 7

Medium Batch 2.0 um SCNR Clusters, TiC Starting Material

Titanium carbide, roughly 2.0 um particle size, was procured from Alfa Aesar (Stock No. 40178, Ward Hill, Mass.). The material was utilized as received, with no pre-cleaning or other treatment prior to use. 50 g of the powder was dispersed evenly on ten 112 in by 12 in by 0.25 in thick medium grain extruded graphite plates, separated by 1 $in^3$ cube graphite blocks, stacked vertically. The plates were then loaded into a graphite hot zone reactor and evacuated to 1 Torr, then heated to 1700° C. at a rate of 30° C./min. Once at 1700° C., air was introduced into the hot zone at a rate of 20 sccm and the material allowed to react for 48 hrs, then cooled without air injection to room temperature where the material was unloaded and examined Analysis by TEM confirmed the presence of SCNR clusters.

Example 8

Medium Batch 325 Mesh SCNR Clusters, ZrC Starting Material

Zirconium carbide, roughly 325 mesh particle size, was procured from Alfa Aesar (Stock No. 35808, Ward Hill, Mass.). The material was utilized as received, with no pre-cleaning or other treatment prior to use. 50 g of the powder was dispersed evenly on ten 12 in by 12 in by 0.25 in thick medium grain extruded graphite plates, separated by 1 $in^3$ cube graphite blocks, stacked vertically. The plates were then loaded into a graphite hot zone reactor and evacuated to 1 Torr, then heated to 1700° C. at a rate of 30° C./min. Once at 1700° C., air was introduced into the hot zone at a rate of 20 sccm and the material allowed to react for 48 hrs, then cooled without air injection to room temperature where the material was unloaded and examined Analysis by TEM confirmed the presence of SCNR clusters, but due to size, decomposition was not complete.

Purity Characterization

Table 1, below, lists the purities of typical SCNRs as produced by the instant invention. Testing was done by Galbraith Laboratories (Oakridge, Tenn.) by ICP-MS.

TABLE 1

| Material | Lot No. | Species Tested For | Mass % |
| --- | --- | --- | --- |
| SCNR NanoClusters | FebCentorr06 | Carbon | 99.91 |
|  |  | Oxygen | <0.05 |
|  |  | Silicon | 0.08 |
| SCNR Whiskers | 111407Whisker | Carbon | 99.98 |
|  |  | Oxygen | <0.05 |
|  |  | Silicon | 0.01 |

Figure 9:
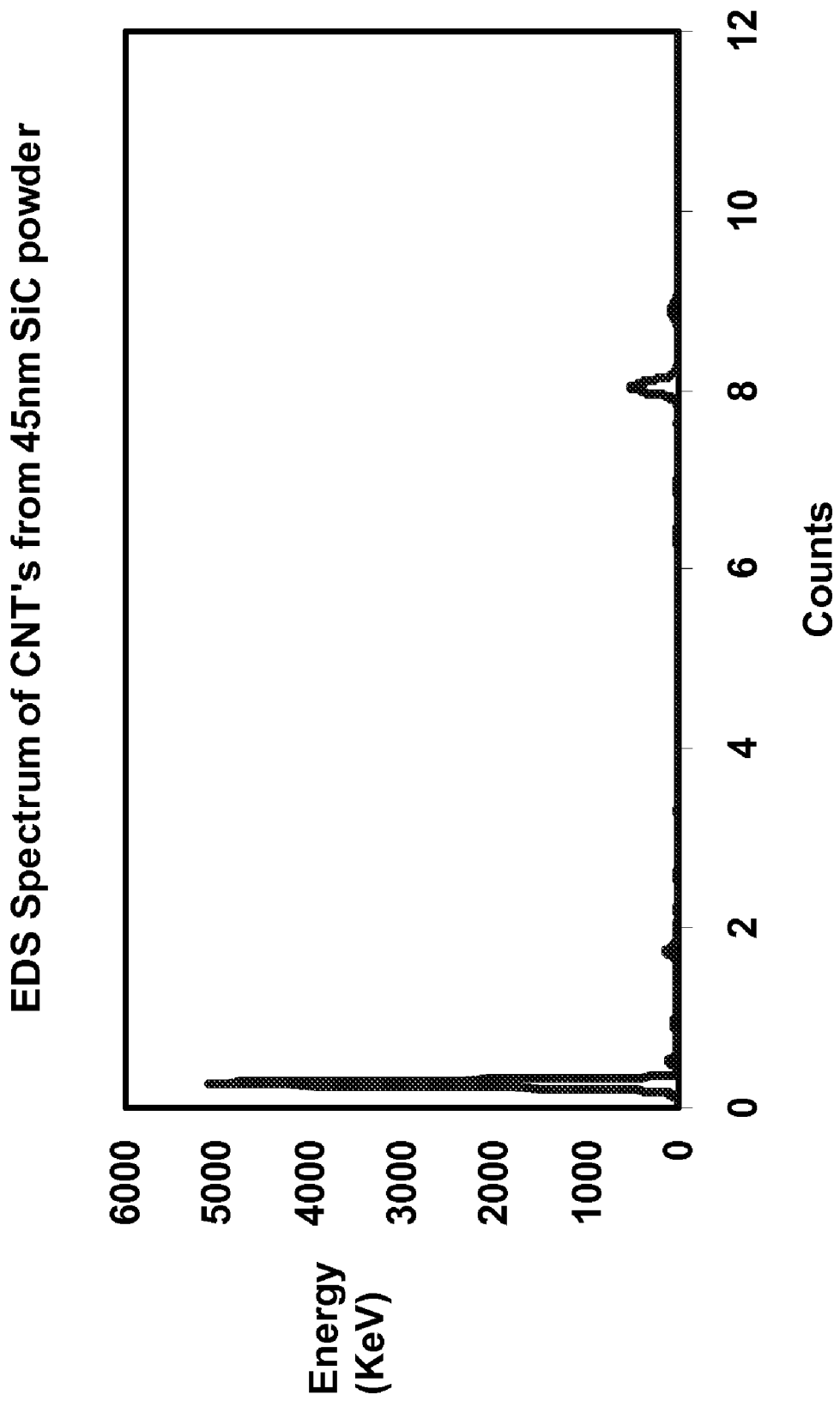
FIG. 9 is a graph of an EDS spectrum of SCNR nanoclusters from 45 nm SiC powder.

Alternatively, the purity of SCNRs may be obtained using an energy-dispersive (EDS) detector. The EDS separates and analyzes the characteristic x-rays of a sample to determine the abundance of a specific element, such as carbon in an SCNR. FIG. 9 shows an EDS spectrum resulting from the EDS analysis of CNT's from 45 nm SiC powder, indicating 99.87% carbon content based on the peak nearest zero counts having 5000 KeV of energy.

Electrochemical Characterization

Fundamental differences between CNTs and SCNRs produced according to the instant invention are both the purity, in terms of the carbon content, and the homogeneity, in terms of the relative amounts of the desired carbon nanostructure in the final product. SCNRs produced by the process described herein are more than 99.9% carbon and have comparable levels of homogeneity. That is, for example in the case where nanoclusters of SCNRs are the desired product, the process of the instant invention results in a product that is greater than 99.9% pure and is composed of at least 99.9% SCNR nanoclusters and contains less than 0.1% amorphous carbon and/or other carbon nanostructures.

Many CNTs are produced via processes that involve the use of metal or metal oxide nanocrystals to catalyze the formation of CNTs. The presence of such metal impurities can severely limit the utility of these materials in electrochemical applications. Electrodes fabricated using such materials display elevated and variable background currents and have a limited potential window over which they can function effectively, compared to electrodes composed of SCNRs and/or SCNR clusters produced by the process of the instant invention. This can be seen in FIG. 10 which shows typical background scans done using cyclic voltammetry on electrodes fabricated with commercially available MWCNTs, carbon paste electrodes, and SCNR nanoclusters made using SiC nanopowder (50-150 nm) pretreated and processed as described in Example 4.

Figure 10:
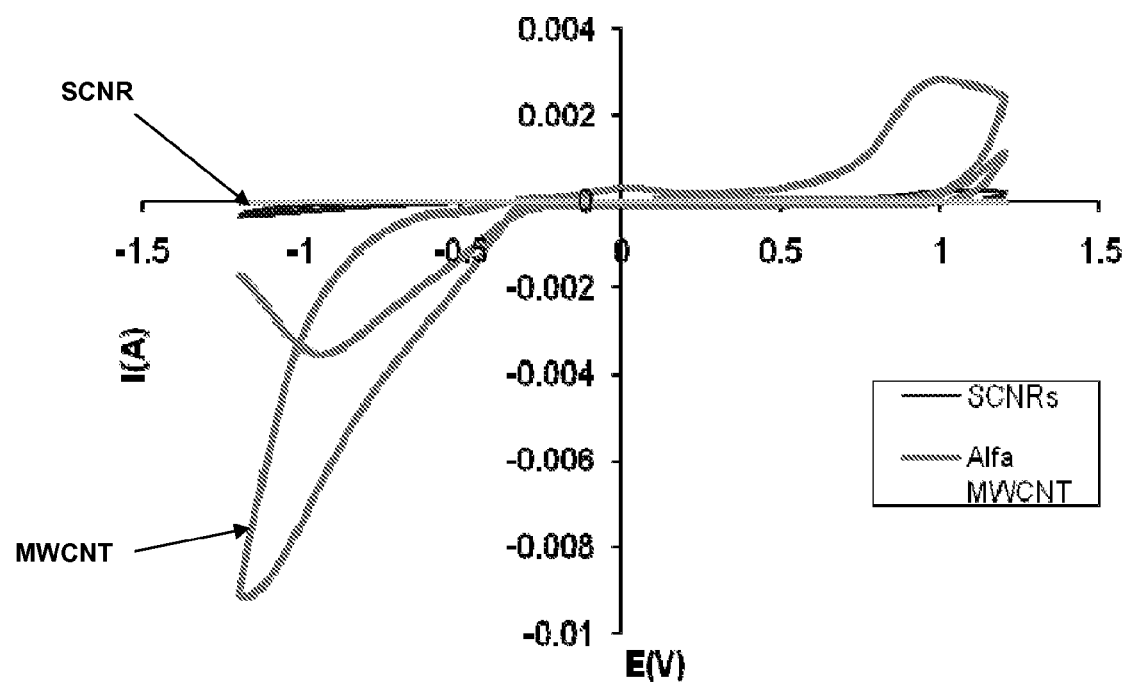
FIG. 10 is a cyclic voltammetry background scan for an SCNR and a MWCNT.

The MWCNT and SCNR electrodes used in FIG. 10 were fabricated by mixing the carbon materials with an equal weight of mineral oil, compacting the slurry into a BAS, Inc. electrode holder and leveling the slurry using a glass slide so that the electrode was co-planar with the external surface of the holder. Electrodes were immersed in a 1.0M $KNO_3$ aqueous solution and cyclic voltammometry was performed using a scan rate of 100 mV/sec. FIG. 10 shows both the first and second scans performed on the MWCNT electrode. The background current is much greater on the first scan than the second and continues to decay for several scans thereafter. Regardless, of the number of scans the background current remains elevated compared to the electrode containing SCNRs which has background currents more comparable to the low background currents seen on commercially available waxy carbon electrodes.

Figure 11:
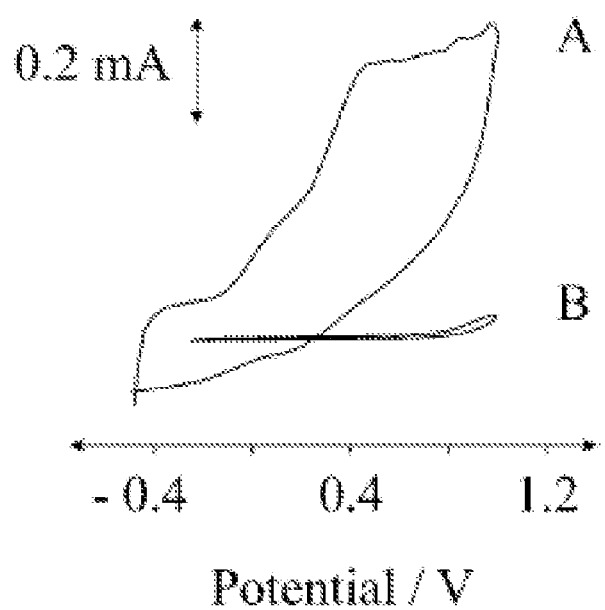
FIG. 11 is a cyclic voltammogram of MWCNTs (A) and SCNR (B) clusters in the presence of 1 mM hydrazine.

Now referring to FIG. 11, an SCNR cluster electrode (B) made according to the process described above for FIG. 10 was compared to a commercially available MWCNT electrode (A) to demonstrate the effect of metallic impurities. The electrodes were prepared by immobilizing the carbon nanomaterial under test on a basal plane graphite electrode. This graphite substrate by itself generally displays slow heterogeneous electron transfer rates when species present in the solution are probed. Voltammetric scans (1 mV/sec) were done in pH 7.1 phosphate buffer which was also 1 mM in hydrazine. This electrochemical probe is highly sensitive to metallic impurities, since it can only be oxidized at a metal containing electrode and not on a pure carbon electrode. FIG. 11 illustrates that the presence of metal impurities in commercially available MWCNTs can grossly affect electrochemical behavior when such materials are incorporated into electrodes. The presence of a large electrochemical oxidation wave at about +0.46 volts (vs. SCE), confirms the presence of metal impurities in the electrode fabricated using commercially available MWCNTs (NanoLab) and its absence in the scan on the electrode containing SCNRs clusters confirms the absence of metal impurities in these materials.

Figure 12:
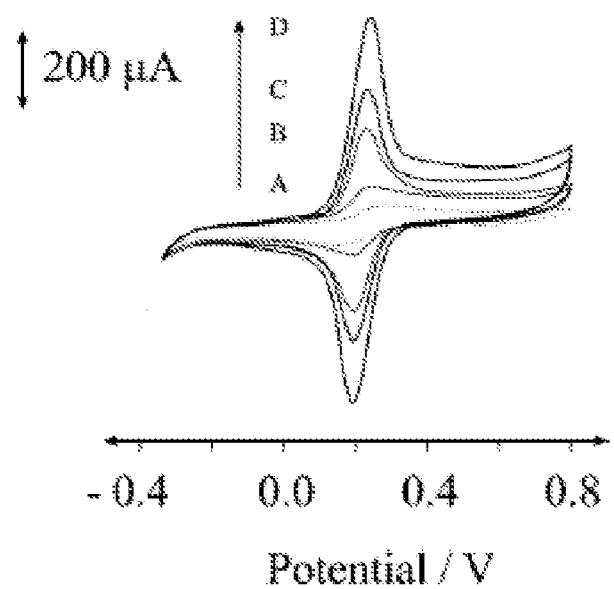
FIG. 12 is a cyclic voltammogram of ferri-ferrocyanide on an electrode fabricated with SCNR clusters.

Electrodes fabricated using SCNRs and SCNR clusters made as described above can also display improved electron transfer rates compared to electrodes made with commercially available MWCNTs. The response of the SCNR cluster electrodes in a 1 mM potassium ferrocyanide/0.01M KCL solution was evaluated. The cyclic voltammography results for the SCNR cluster electrode are shown in FIG. 12. The dotted line in FIG. 12 represents the bare basal plane pyrolytic graphite electrode. Curves A-D result from increasing amounts, 20-80 micrograms, of SCNR clusters immobilized on the basal plane pyrolytic graphite surface. Ferri/ferrocyanide is a model redox couple which is commonly used to judge electrode performance. Consistent with electrochemical theory, the potential difference measured between the oxidation and reduction peaks (peak-to-peak separation) should be 59 mVs for a reversible redox couple. For electrodes fabricated using SCNR clusters, the peak-to-peak separation measured at a scan rate of 10 mv/sec was 60 mV vs. 66 mV for electrodes fabricated using commercially available MWCNTs (NanoLab). This demonstrates that electrodes incorporating the SCNR clusters display more rapid electron transfer rates than those made using commercially available MWCNTs.

Raman Spectroscopy Characterization

Raman spectroscopy is a very powerful technique for the investigation of electronic structure generally in carbon, and specifically carbon nanostructures. This method employs a laser for excitation of specific vibrational and rotational state transitions. The wavelength and intensity of scattered laser light is measured and indicates specific changes in vibrational and rotational energies of the scattering molecules. The wavelength and intensity of the scattered light also depends on the wavelength of the laser used for excitation. Of particular interest in cylindrical and tubular nanostructured crystalline carbon such as SCNRs and CNTs are: radial breathing mode vibrations, typically 100 to 400 $cm^{-1}$ which are often used to determine diameters of CNTs and verify the presence of a tubular structures such as concentric rings of CNTs and SCNRs; "G" band vibrations, typically around 1580 $cm^{-1}$, indicating in plane vibrations; "D" band vibrations—often termed "defect band", typically around 1350 $cm^{-1}$, indicating disruptions in the $sp^2$ bonds; and "G*" band vibrations which are second harmonics of the G band transition. Consequently, Raman spectroscopy can be used as a definitive tool to differentiate various carbon crystalline structures.

Figure 13A:
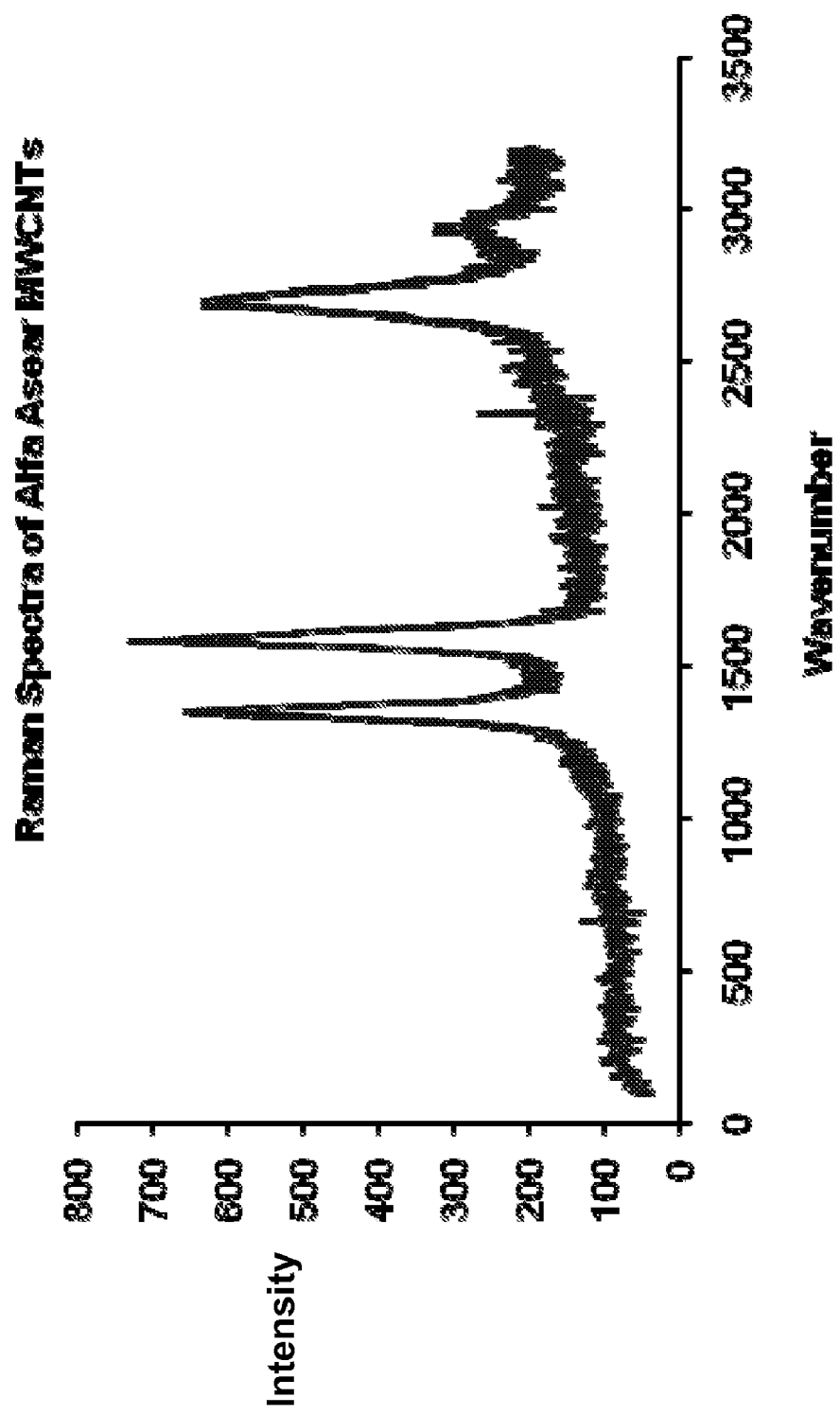
FIGS. 13A-13B are Raman spectra of MWCNTs using a 514 nm excitation laser.
Figure 13B:
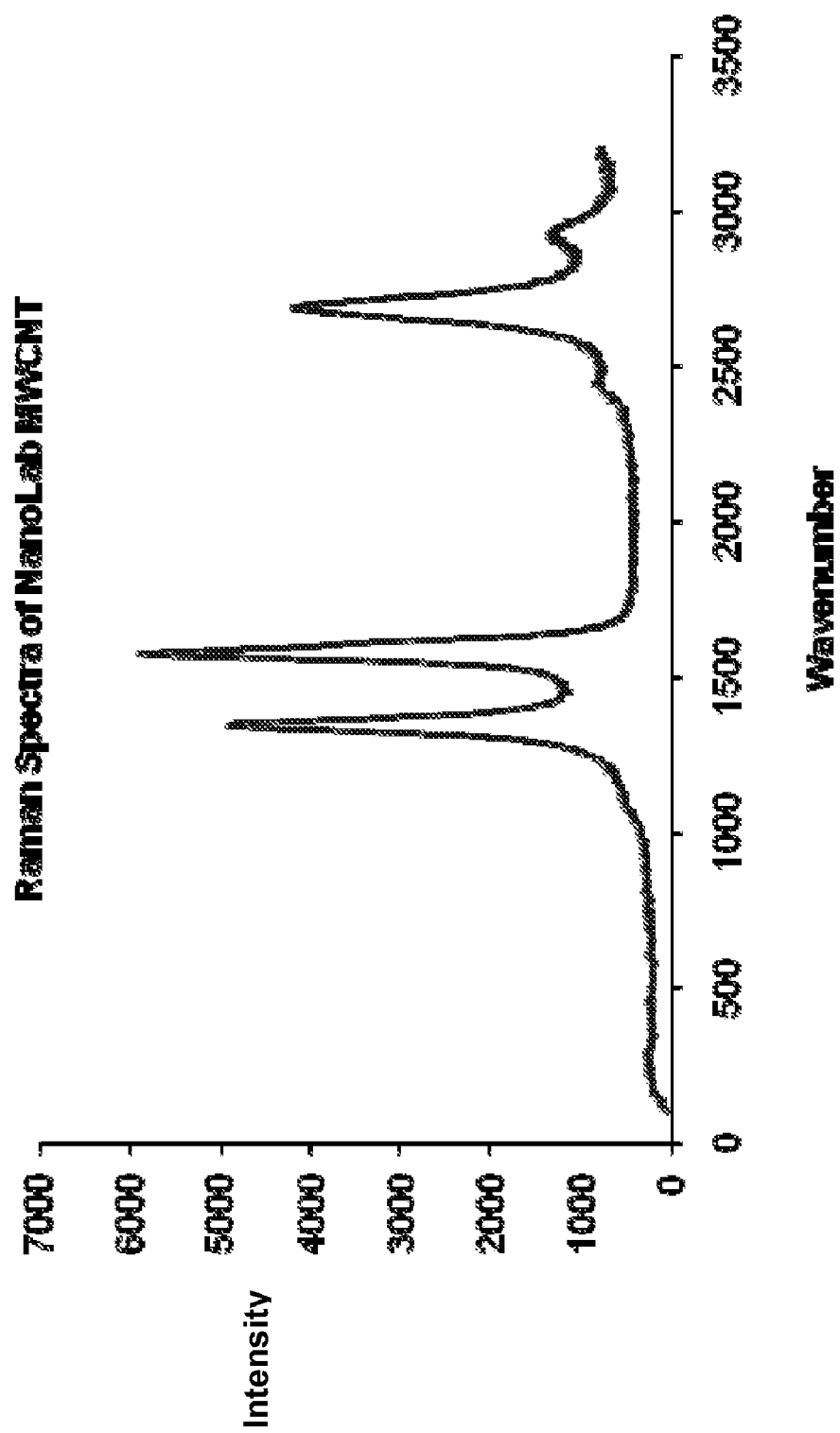
Figure 14A:
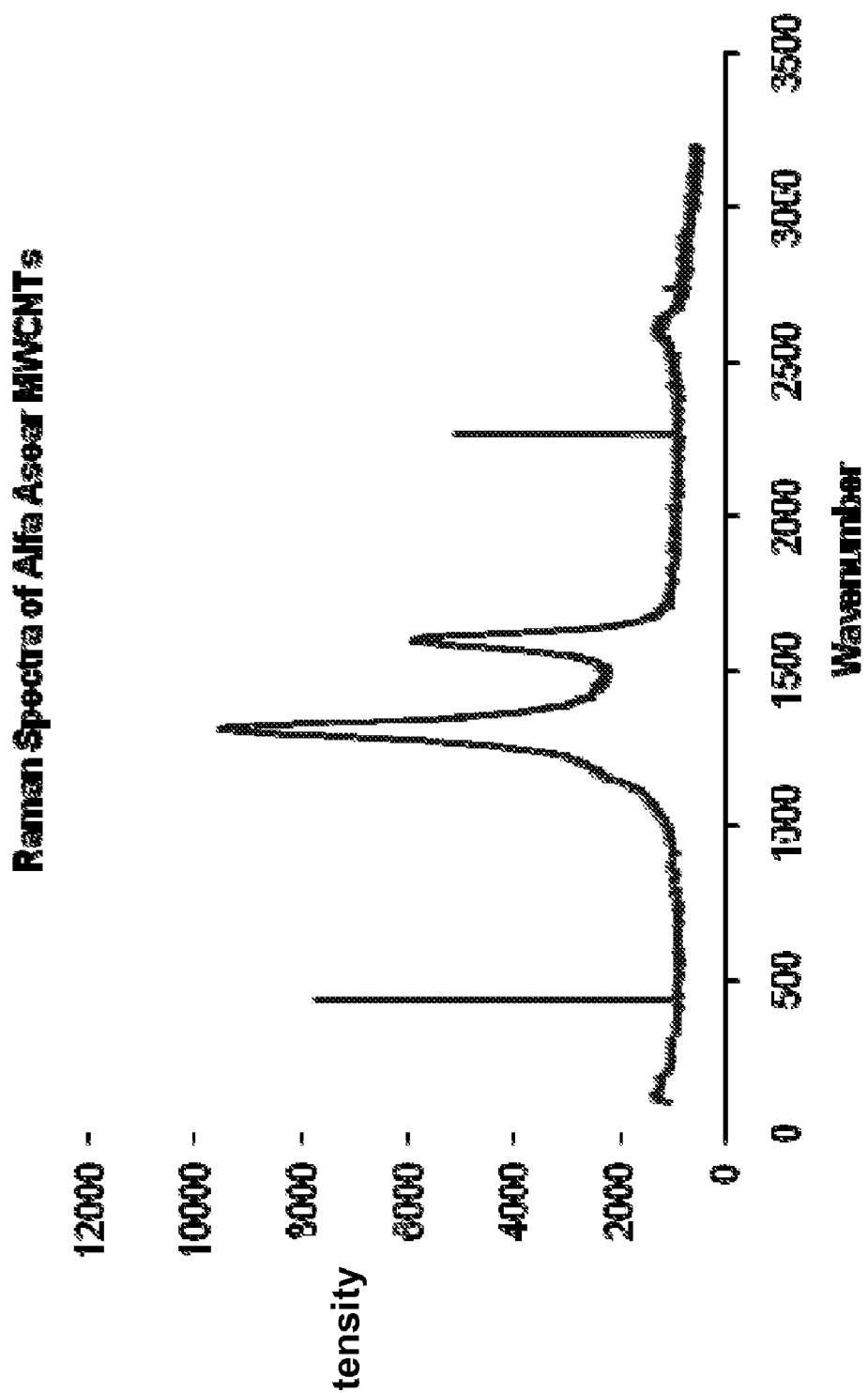
FIGS. 14A-14B are Raman spectra of MWCNTs using a 785 nm excitation laser.
Figure 14B:
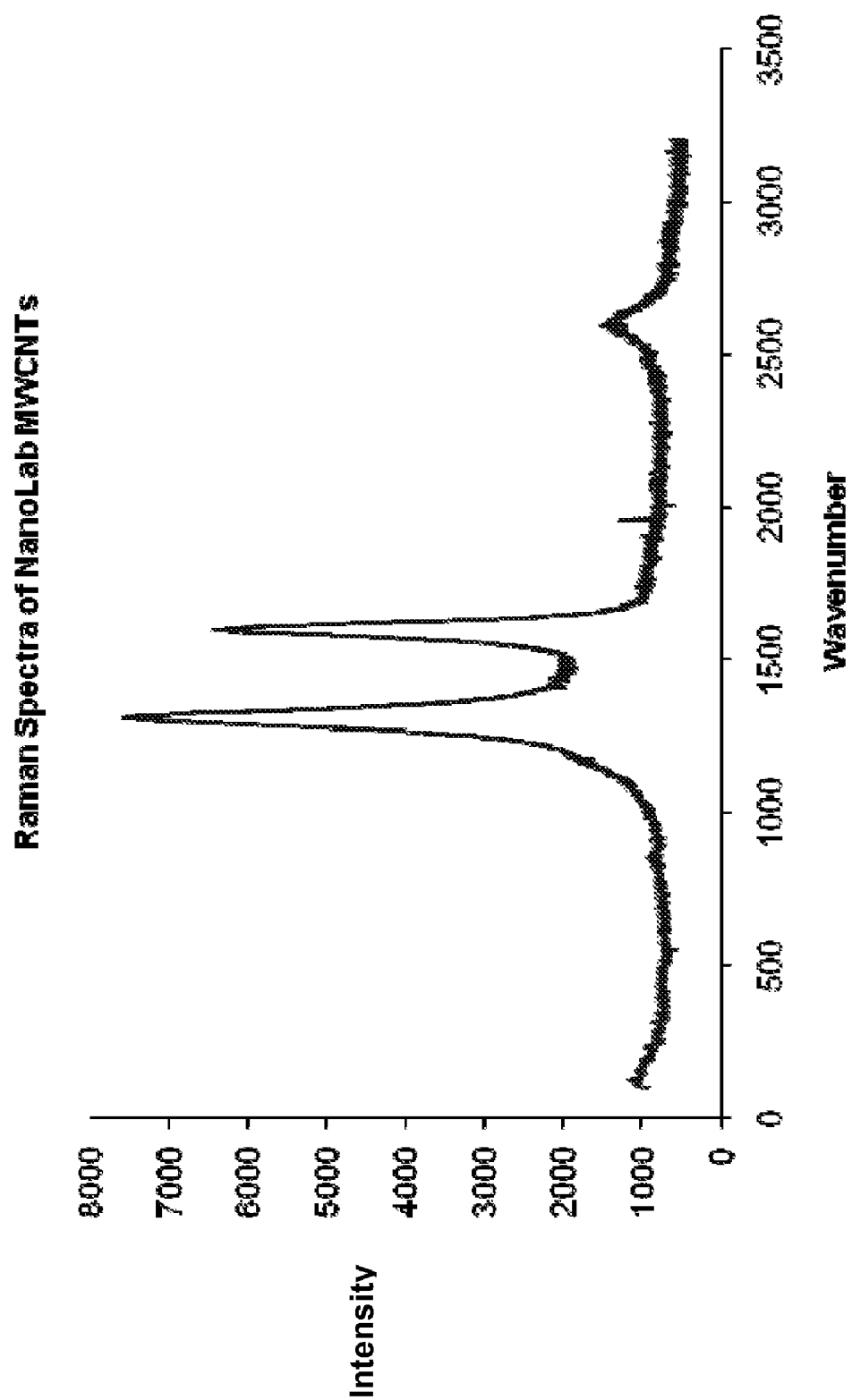

FIGS. 13A-13B show Raman spectra of two commercially available MWCNTs (Alfa Aesar (FIG. 13A) and NanoLab (FIG. 13B)), showing the characteristically large D:G intensity ratios using a 514 nm laser. FIGS. 14A-14B show the Raman spectra of the Alfa Asear and NanoLab MWCNT samples using a 785 nm excitation frequency. FIGS. 13 and 14 are typical of what one would expect from conventional MWCNTs produced via chemical vapor deposition—large D:G, obscured RBMs, and broad peaks resulting from the distribution of chiralities and dimensions.

Figure 15A:
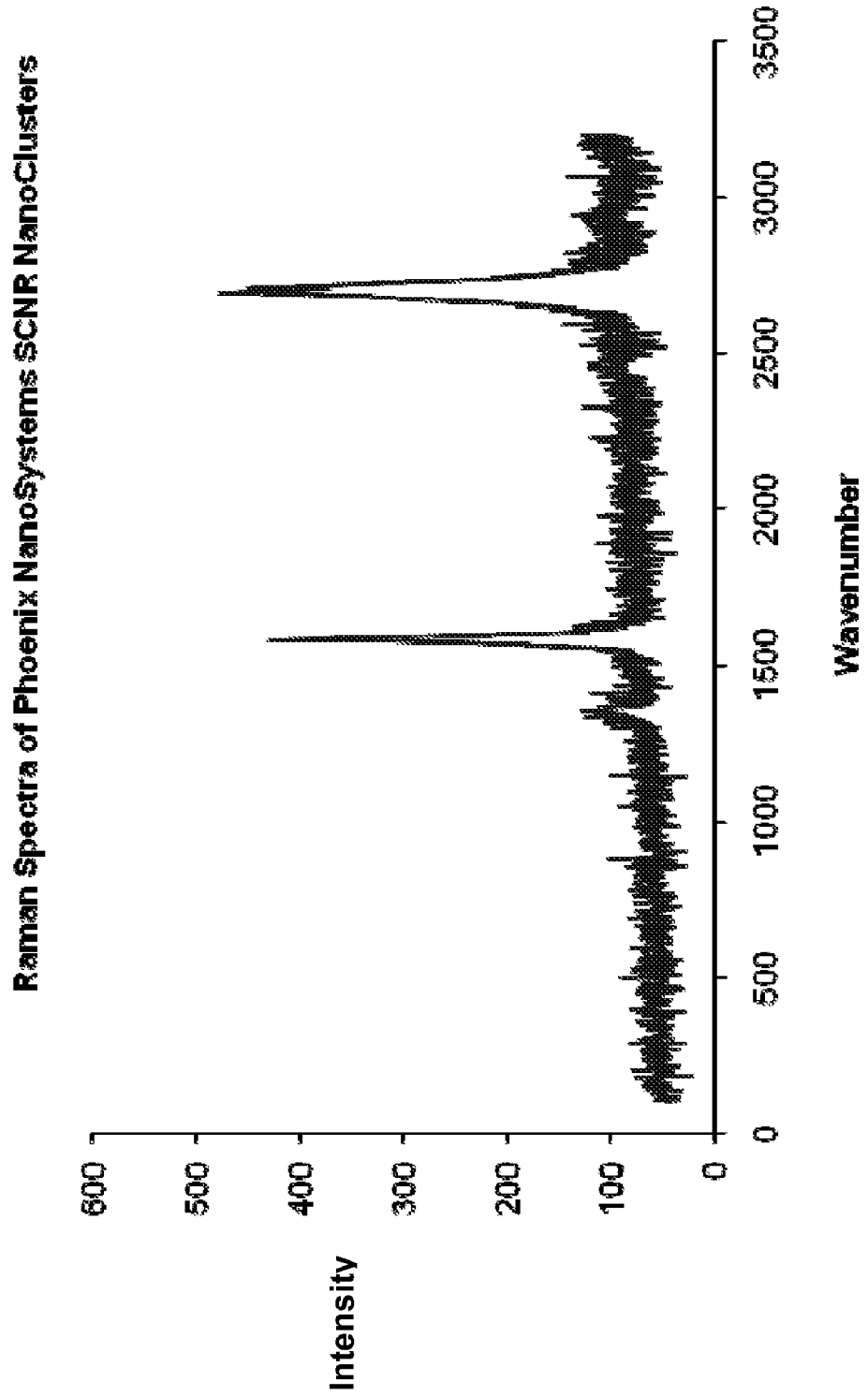
FIGS. 15A-15B are Raman spectra of SCNRs using a 514 nm excitation laser.
Figure 15B:
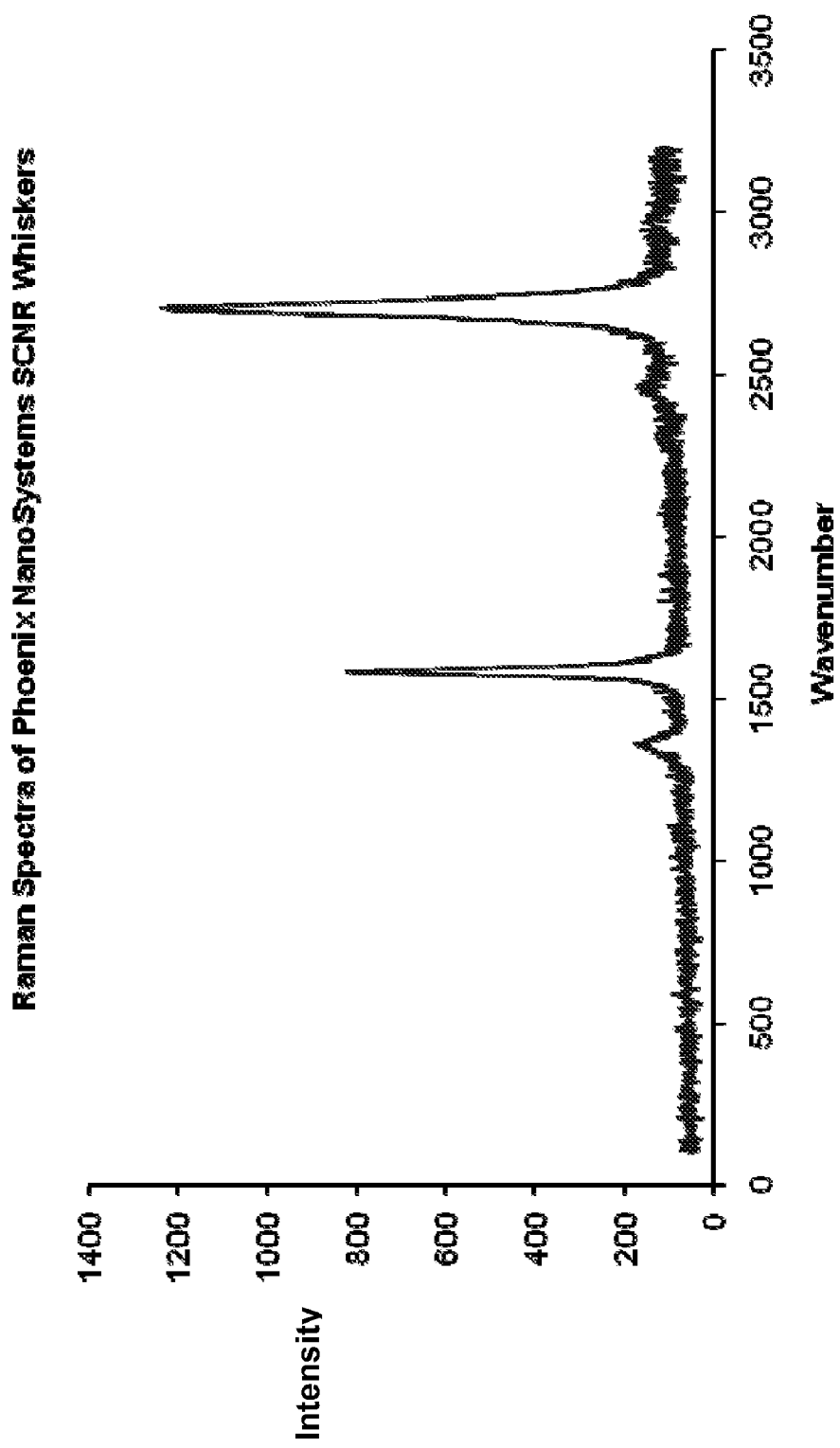

FIGS. 15A-15B show the Raman spectra of typical SCNR materials, SCNR nanoclusters in FIG. 15A and SCNR Whiskers in FIG. 15B, using a 514 nm excitation frequency. Of particular note in the SCNR spectra are the sharp, well defined G peaks, very large G* intensity, and the smaller D:G ratios as compared with the commercial CNT material.

Figure 16A:
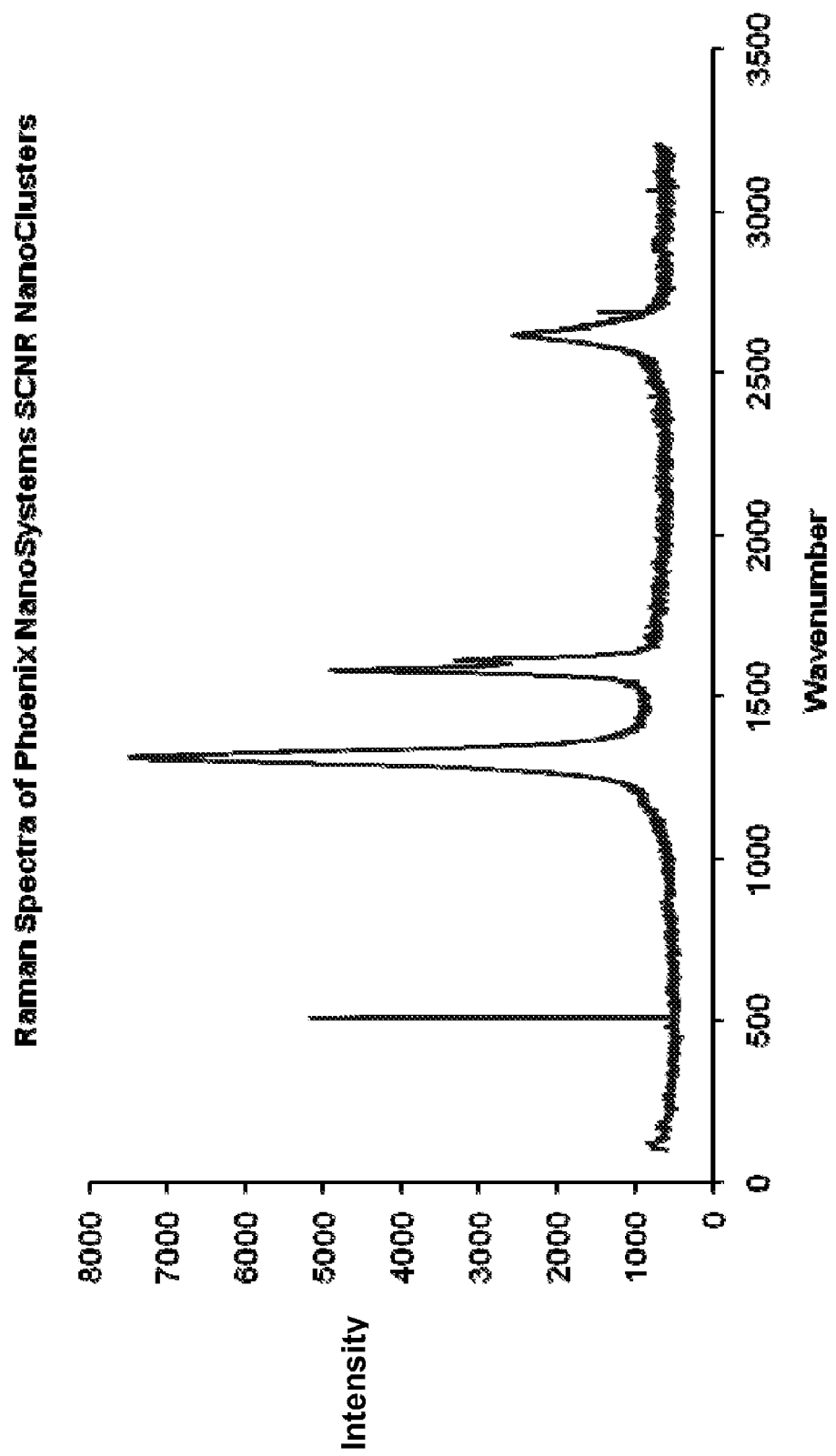
FIGS. 16A-16B are Raman spectra of SCNRs using a 785 nm excitation laser.
Figure 16B:
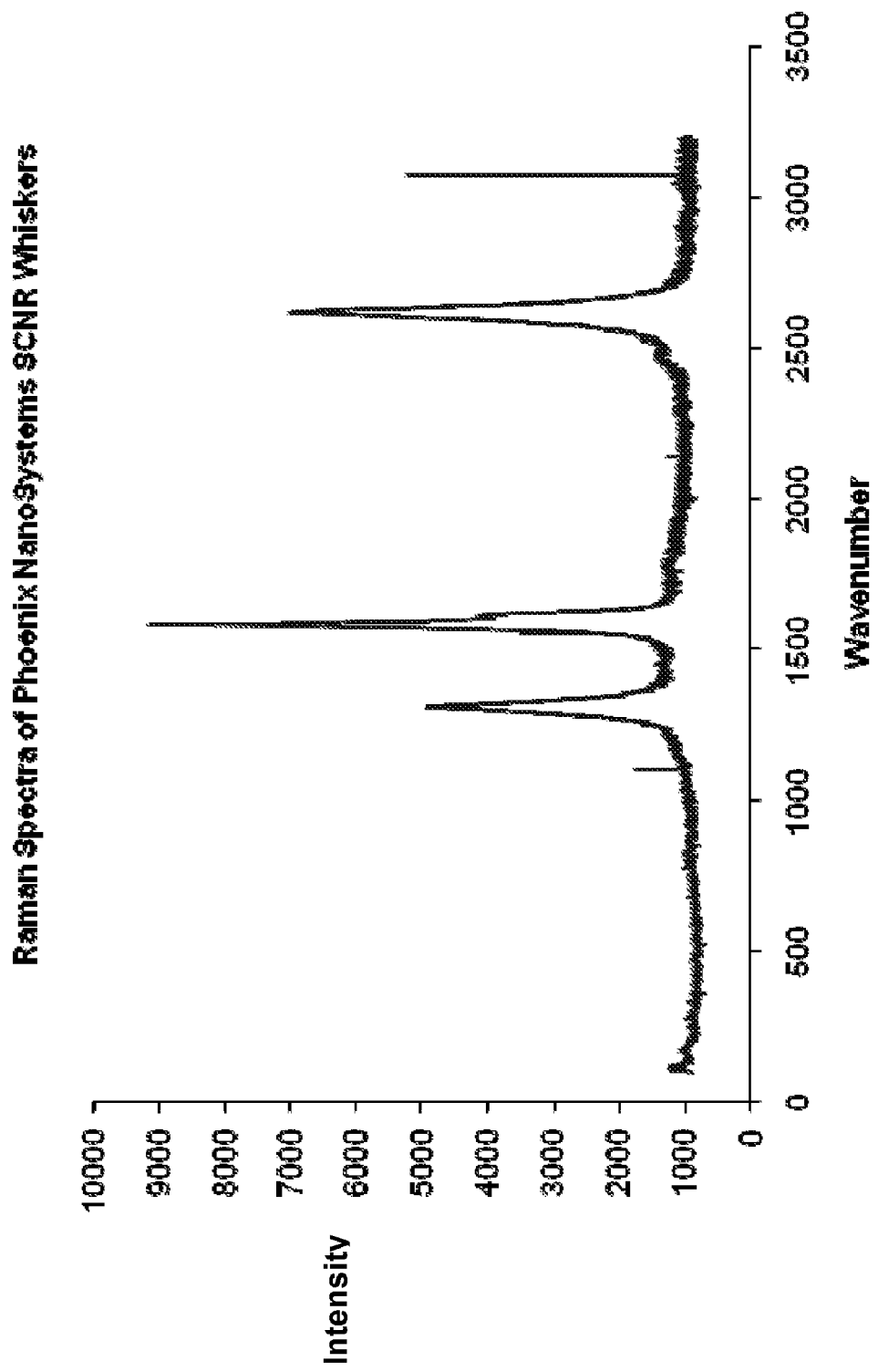

FIGS. 16A-16B show the Raman spectra of SCNR nanoclusters and SCNR Whiskers using a 785 nm excitation laser. The 785 nm excitation frequency allows observation of two key features in SCNR morphology as compared with MWCNTs, alluding to the consistency and utility of the material. The first feature of note is the RBM vibrations, present in both samples at 115 and 170 $cm^{-1}$. Secondly, note that the D and G peaks are significantly narrower in width than the commercial MWCNT materials. This is a direct result of the consistency of the product. Variations in peak locations varies with material dimensions and defect content and type, resulting in a smearing of multiple peaks into a single, broader peak present in commercial material. Thus greater consistency is evident in the material produced by the instant invention by the G peak separation (into G+ and G−). This separation is a result of the variation in the elastic vibrations of the crystal structure in the direction of the rod axis, and that of the vibration tangential to the tube circumference.

Figure 17A:
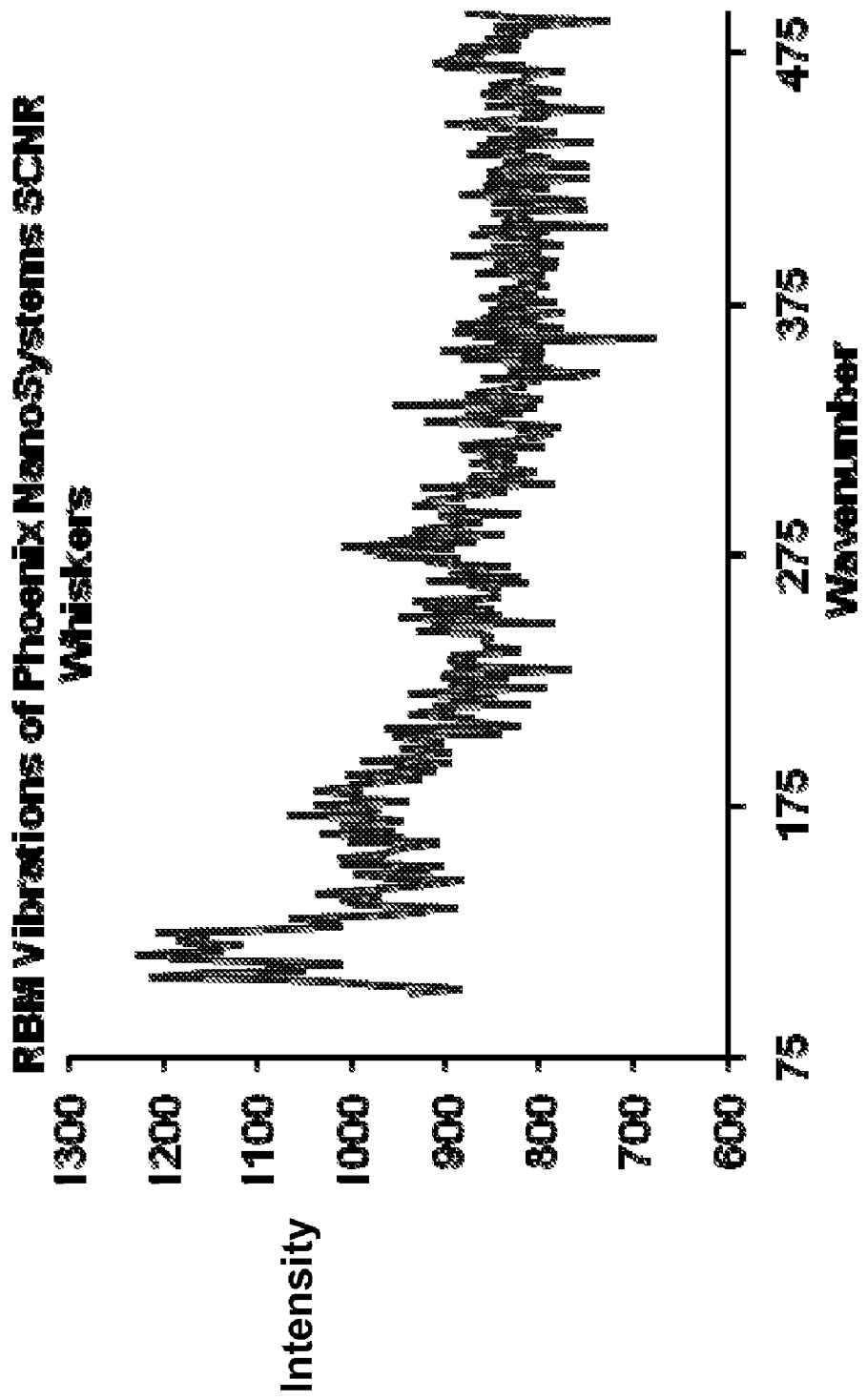
FIGS. 17A-17B are RBM Vibrations of SCNRs using a 785 nm excitation laser.
Figure 17B:
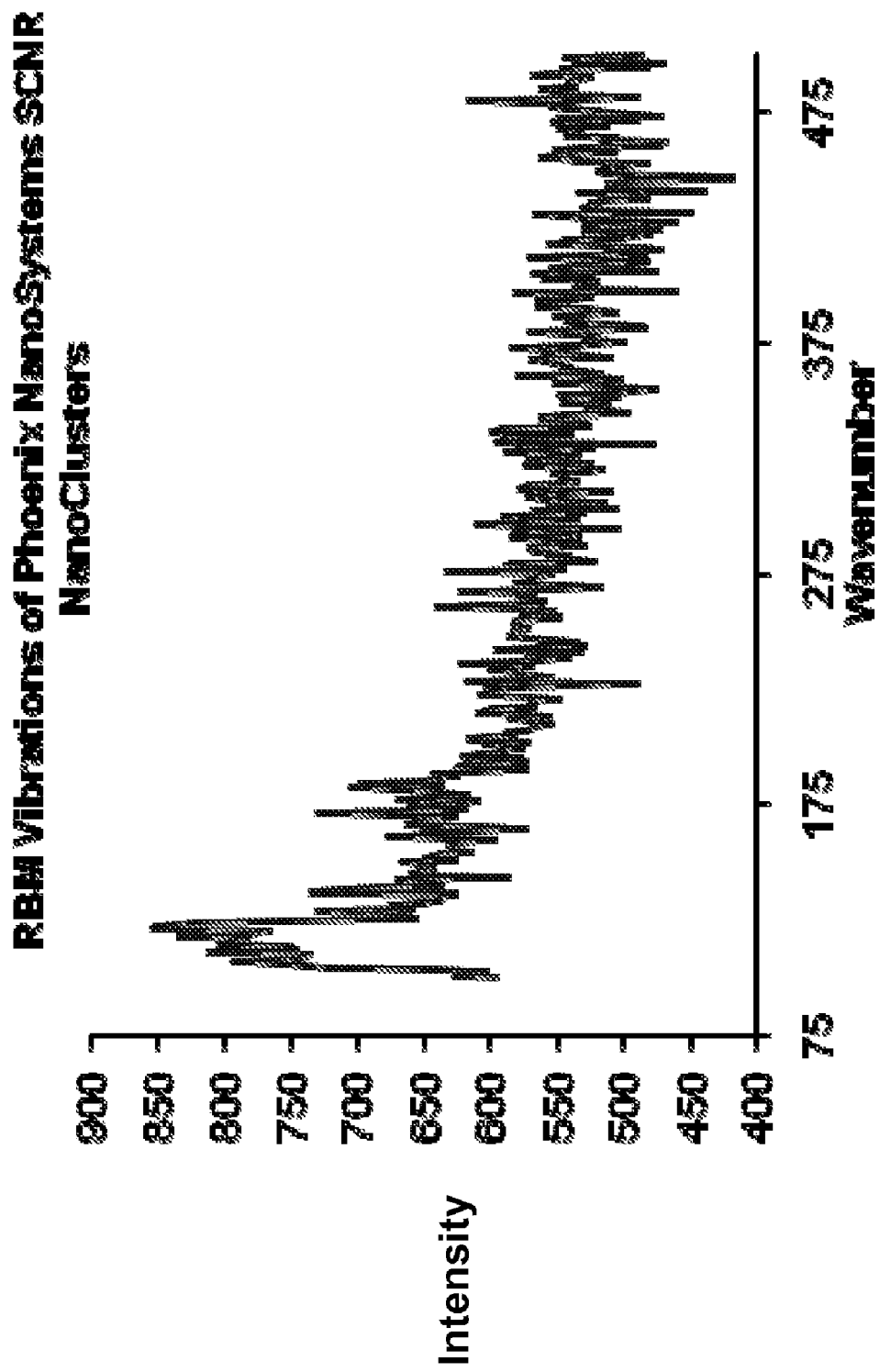
Figure 18A:
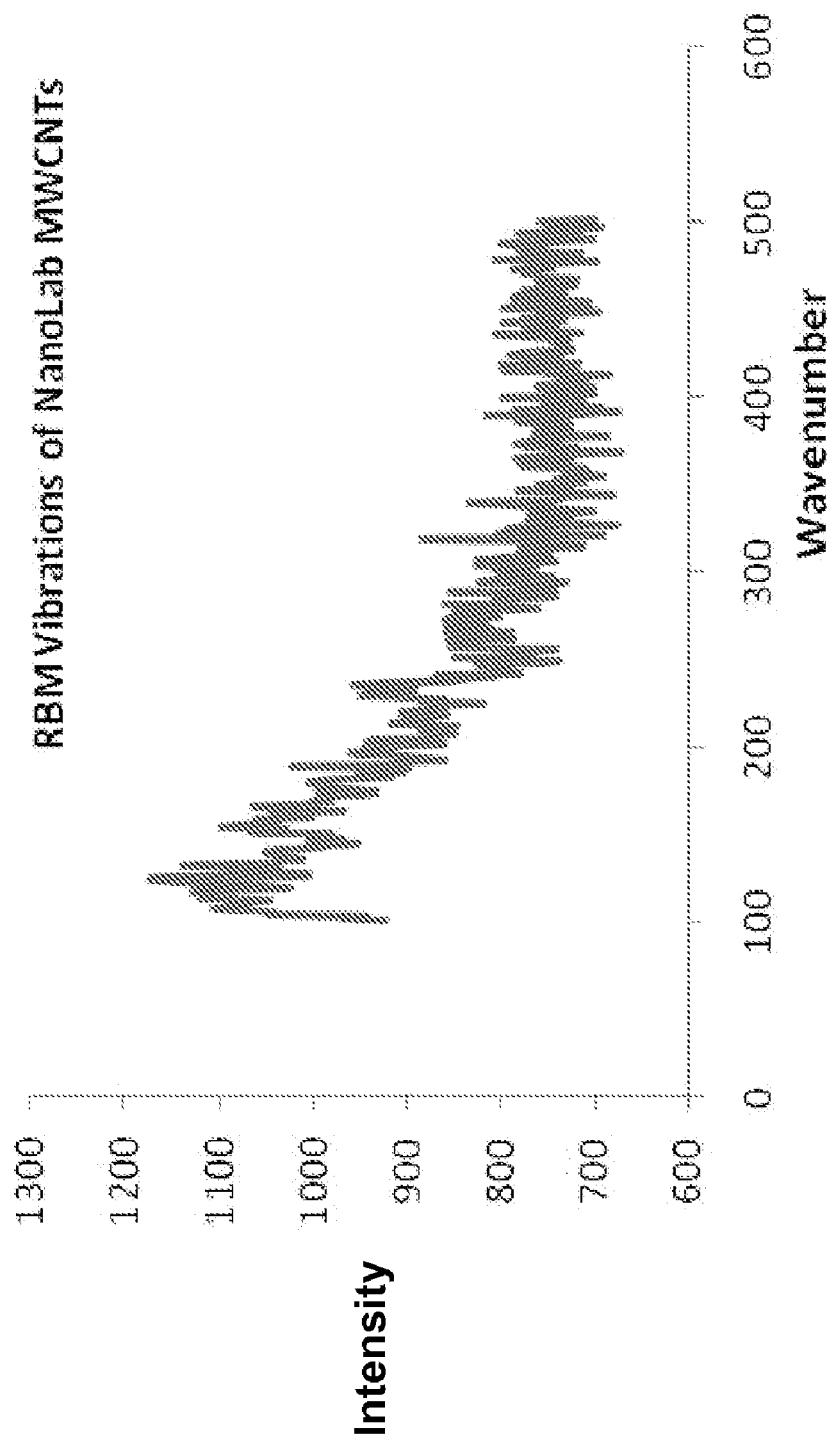
FIGS. 18A-18B are RBM Vibrations of MWCNTs using a 785 nm excitation laser.
Figure 18B:
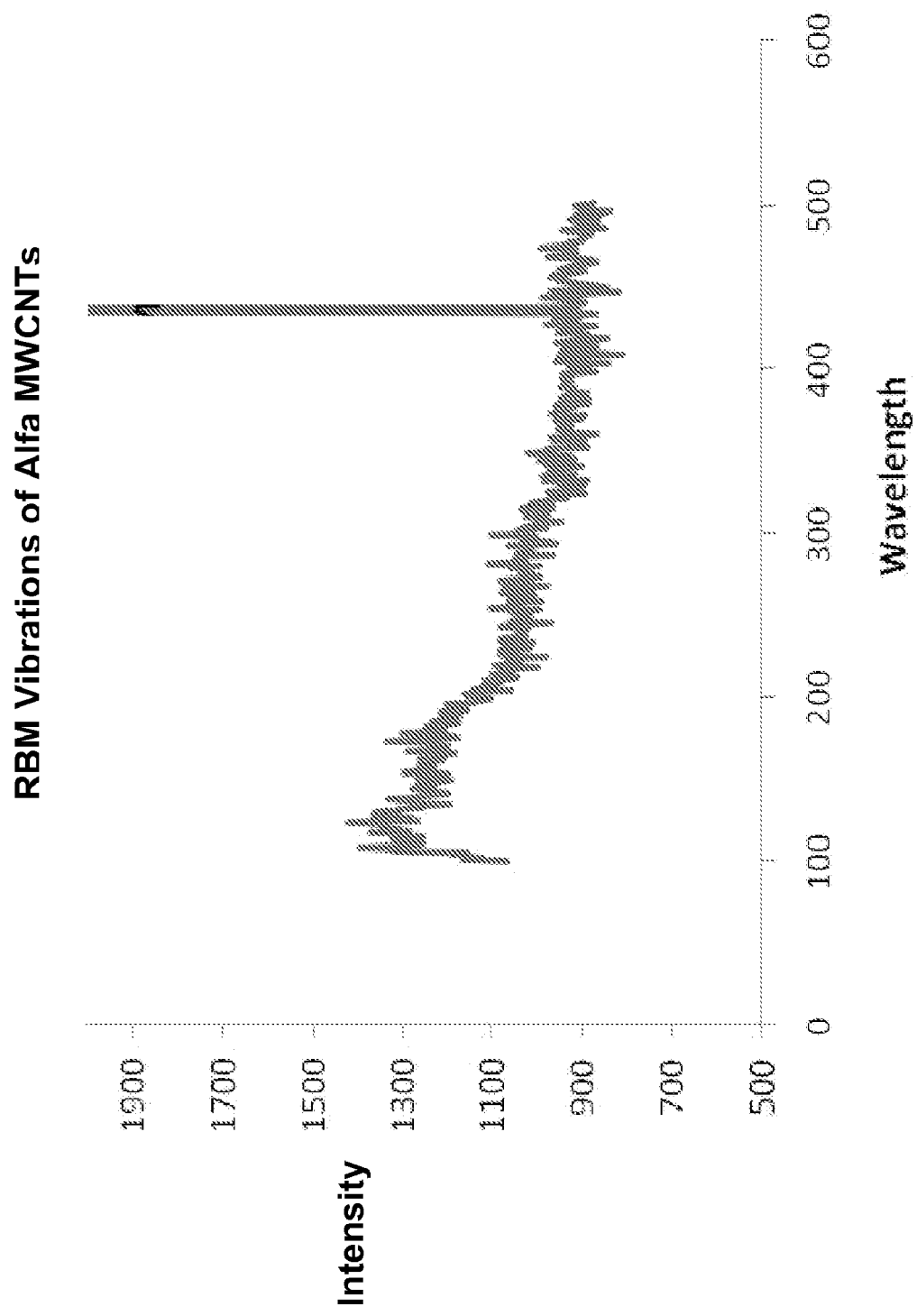

FIGS. 17A-17B show the RBM vibrations for SCNR nanoclusters (FIG. 17B) and SCNR Whiskers (FIG. 17A) using a 785 nm excitation laser, whereas FIGS. 18A-18B show the absence of an RBM vibrational mode for the commercially available MWCNT samples. As can be seen by comparing FIGS. 17 and 18, the SCNR RBM spectra indicate a more defined diameter range, while the MWCNT samples, by virtue of the broader, smeared peaks indicate a larger distribution of diameters than the SCNR samples. This is typical of CVD produced CNTs, and MWCNTs in particular.

Table 2 summarizes the Raman spectra, listing the main features examined with SW- and MW-CNTs, and SCNRs. These include the disorder band, the so called "D" band, the in plane graphitic band, the so called "G" band and its splitting, and the G* and RBM bands. Splitting of the "G" band occurs on consistent cylindrical materials, such as SW-CNTs and SCNRs due to the two modes of stretching seen in the rolled graphite sheet, axial (along the cylinder or tube axis) and tangential (normal to the RBM stretching).

TABLE 2

Typical CNT and SCNR Raman Spectra Features

| Material | Excitation | RBM | | D | | G(G−) | | G+ | | G* | |
|---|---|---|---|---|---|---|---|---|---|---|---|
| | | cm$^{-1}$ | cnts | cm$^{-1}$ | cnts | cm$^{-1}$ | cnts | cm$^{-1}$ | cnts | cm$^{-1}$ | cnts |
| Alfa MW | 514 | NA | NA | 1354 | 560 | 1583 | 632 | | | 2710 | 516 |
| | 785 | NA | NA | 1311 | 8609 | 1607 | 4916 | | | 2621 | 411 |
| NanoLab MW | 514 | NA | NA | 1351 | 4481 | 1575 | 5544 | | | 2691 | 3750 |
| | 785 | NA | NA | 1312 | 6783 | 1600 | 5480 | | | 2608 | 675 |
| SCNR NC | 514 | NA | NA | 1354 | 64 | 1581 | 359 | | | 2698 | 483 |
| | 785 | 115 | 188 | 1312 | 6834 | 1581 | 4259 | 1612 | 3630 | 2621 | 1790 |
| SCNR Whisker | 514 | NA | NA | 1366 | 98 | 1581 | 764 | | | 2710 | 1162 |
| | 785 | 115 | 438 | 1313 | 4151 | 1580 | 8386 | 1611 | 3399 | 2617 | 6168 |

*Peak Intensities (cnts) are background corrected.

Peak shape and location illustrate consistency in the materials produced via the instant invention over commercially available MWCNTs. The G band splitting for SCNRs serves to demonstrate this consistency, above that of MWCNTs where the splitting is obscured due to variations in tube dimensions and chirality.

Raman features which definitively define the SCNR nanostructure compositions of the instant invention compared to MWCNTs are as follows: 1) very low G/D band intensity ratios (0.3 or less) compared to MWCNTs at 514 nm excitation, 2) narrower G, D and G* bands compared to MWCNTs at 785 nm excitation, 3) presence of RBMs at 785 nm excitation and 4) splitting of the G peak into G+ and G− peaks at 785 nm excitation.

What is claimed is:

1. A process for producing carbon nanostructures comprising the steps of:
    introducing a reactive gas into a reactor containing a carbide substrate, the reactive gas comprising a carbon oxide;
    reacting the reactive gas with the carbide substrate by a reaction that converts carbon in the carbide substrate to elemental carbon nanostructures and produces a gaseous byproduct; and
    removing the gaseous byproduct from the reactor in a manner that shifts the reaction equilibrium to favor the formation of the carbon nanostructures.

2. The process of claim 1 wherein the reactor comprises carbon.

3. The process of claim 1 wherein the carbon oxide is formed in situ in the reactor by introducing an oxygen containing gas into the reactor.

4. The process of claim 1 wherein the reactive gas includes at least one of air and an inert gas.

5. The process of claim 1, wherein the reactive gas is present at a partial pressure greater than about 0.01 Torr.

6. The process of claim 1, wherein the reactive gas is present at a partial pressure of at least about 0.0001 Torr.

7. The process of claim 1, wherein the carbide substrate includes particles of carbide.

8. The process of claim 7, wherein the particles of carbide are agitated as they are reacted with the reactive gas.

9. The process of claim 1, wherein the carbide substrate comprises a graphite tray coated with a carbide powder having a particle size of about 10 nm to 50 μm.

10. The process of claim 1, wherein the carbide substrate comprises a porous or non-porous carbide.

11. The process of claim 10, wherein the carbide substrate comprises monocrystalline carbide, polycrystalline carbide or amorphous carbide or a mixture thereof.

12. The process of claim 11, wherein the carbide substrate is monolithic.

13. The process of claim 1, wherein the carbide substrate is reacted at a temperature of about −20° C. to 3000° C.

14. The process according to claim 1, wherein the carbide substrate is reacted at a temperature of about 900° C. to 1900° C.

15. The process according to claim 1, wherein the carbide substrate is reacted at a temperature of about 1400° C. to 1700° C.

16. The process of claim 1, wherein the step of reacting the carbide substrate occurs at a pressure in excess of 10$^{-4}$ Torr.

17. The process of claim 16, wherein the pressure is at least about 1 Torr.

18. The process of claim 1, wherein the reaction of the carbide substrate is conducted under conditions of pressure and temperature that yield solid carbon nanorods.

19. The process of claim 18, wherein the reactive gas is introduced at a rate that favors the formation of the solid carbon nanorods.

20. The process of claim 19, wherein the rate of introduction of the reactive gas is about 1 sccm to 50 sccm per liter of reactor volume at a temperature of about 1600° C. to 1700° C. to yield larger diameter solid carbon nanorods.

21. The process of claim 19, wherein the temperature is about 1400° C. to 1550° C. to yield smaller diameter solid carbon nanorods.

22. The process of claim 19, wherein the reactive gas is introduced at a rate of about 20 sccm per liter of reactor volume.

23. The process of claim 1, wherein the reaction of the carbide substrate is conducted under conditions of pressure and temperature that yield carbon nanotubes.

24. The process according to claim 23, wherein the reactive gas is introduced at a rate that favors the formation of the carbon nanotubes.

25. The process according to claim 24, wherein the reactive gas is introduced at a rate of about 0.1 sccm per liter of reactor volume.

26. The process of claim 23, wherein the carbon nanotubes are single walled, multiwalled, or a combination thereof.

27. The process according to claim 26, wherein the reaction of the carbide substrate is conducted at temperatures of about 1200° C. to 1500° C. to favor formation of single walled carbon nanotubes.

28. The process of claim 23, wherein the carbon nanotubes are free standing.

29. The process of claim 1, further comprising the step of removing passivating compounds from the surface of the carbide substrate before reacting the carbide substrate to form the carbon nanostructures.

30. The process of claim 1, further comprising the step of annealing the carbide substrate prior to said reacting step.

31. The process of claim 30, wherein the carbide substrate comprises monocrystalline carbide, polycrystalline carbide, or amorphous carbide.

* * * * *

UNITED STATES PATENT AND TRADEMARK OFFICE
CERTIFICATE OF CORRECTION

PATENT NO.        : 8,252,264 B2                                    Page 1 of 1
APPLICATION NO.   : 12/936433
DATED             : August 28, 2012
INVENTOR(S)       : Riehl et al.

It is certified that error appears in the above-identified patent and that said Letters Patent is hereby corrected as shown below:

On the title page item (75) should read

--(75)   Inventors:   Bill L. Riehl, Beavercreek, OH (US);
                      Jim R. Riehl, Beaver, OH (US); Lee R. Riehl, Beavercreek, OH (US);
                      Bonnie D. Riehl, Beavercreek, OH (US)--.

Signed and Sealed this
First Day of March, 2016

Michelle K. Lee
*Director of the United States Patent and Trademark Office*